United States Patent
Brito et al.

(10) Patent No.: US 12,242,941 B2
(45) Date of Patent: Mar. 4, 2025

(54) METHOD AND SYSTEM FOR CREATING AN ENSEMBLE OF MACHINE LEARNING MODELS TO DEFEND AGAINST ADVERSARIAL EXAMPLES

(71) Applicant: Palo Alto Research Center Incorporated, Palo Alto, CA (US)

(72) Inventors: Alejandro E. Brito, Mountain View, CA (US); Bashir Sadeghi, East Lansing, MI (US); Shantanu Rane, Palo Alto, CA (US)

(73) Assignee: Xerox Corporation, Norwalk, CT (US)

(*) Notice: Subject to any disclaimer, the term of this patent is extended or adjusted under 35 U.S.C. 154(b) by 937 days.

(21) Appl. No.: 17/345,996

(22) Filed: Jun. 11, 2021

(65) Prior Publication Data
US 2022/0398502 A1    Dec. 15, 2022

(51) Int. Cl.
| | |
|---|---|
| G06N 20/20 | (2019.01) |
| G06F 18/21 | (2023.01) |
| G06F 18/241 | (2023.01) |
| G06N 7/01 | (2023.01) |
| G06N 20/10 | (2019.01) |

(52) U.S. Cl.
CPC ......... *G06N 20/20* (2019.01); *G06F 18/2163* (2023.01); *G06F 18/2193* (2023.01); *G06F 18/241* (2023.01); *G06N 7/01* (2023.01); *G06N 20/10* (2019.01)

(58) Field of Classification Search
CPC .......... G06N 20/20; G06N 20/10; G06N 7/01; G06N 20/005; G06F 18/2163; G06F 18/2193; G06F 18/241; G06K 9/6261; G06K 9/6265; G06K 9/6268
See application file for complete search history.

(56) References Cited

U.S. PATENT DOCUMENTS

| | | |
|---|---|---|
| 2011/0302111 A1 | 12/2011 | Chidlovskii |
| 2019/0068171 A1* | 2/2019 | Li .................. H03H 21/0043 |
| 2020/0410090 A1* | 12/2020 | Baker .................. G06N 20/20 |

OTHER PUBLICATIONS

Ahn et al., "Classification by ensembles from random partitions of high-dimensional data" (Year: 2007).*
Yeh et al., "Adaptive radial basis function networks with kernel shape parameters" (Year: 2012).*

(Continued)

*Primary Examiner* — Randall K. Baldwin

(57) ABSTRACT

One embodiment provides a system which facilitates construction of an ensemble of machine learning models. During operation, the system determines a training set of data objects, wherein each data object is associated with one of a plurality of classes. The system divides the training set of data objects into a number of partitions. The system generates a respective machine learning model for each respective partition using a universal kernel function, which processes the data objects divided into a respective partition to obtain the ensemble of machine learning models. The system trains the machine learning models based on the data objects of the training set. The system predicts an outcome for a testing data object based on the ensemble of machine learning models and an ensemble decision rule.

20 Claims, 19 Drawing Sheets

(56) References Cited

OTHER PUBLICATIONS

Mirza, Ali H. "Computer network intrusion detection using various classifiers and ensemble learning." 2018 26th Signal processing and communications applications conference (SIU). IEEE, 2018. (Year: 2018).*

Liu, Ling, et al. "Deep neural network ensembles against deception: Ensemble diversity, accuracy and robustness." 2019 IEEE 16th international conference on mobile ad hoc and sensor systems (MASS). IEEE, 2019. (Year: 2019).*

Rane, Shantanu, and Alejandro E. Brito. "A Version Space Perspective on Differentially Private Pool-Based Active Learning." 2019 IEEE International Workshop on Information Forensics and Security (WIFS). IEEE, 2019. (Year: 2019).*

Sadeghi, Bashir, Runyi Yu, and Vishnu Boddeti. "On the global optima of kernelized adversarial representation learning." Proceedings of the IEEE/CVF International Conference on Computer Vision. 2019. (Year: 2019).*

Zhang, Xiaoyu, et al. "Cassandra: Detecting Trojaned Networks from Adversarial Perturbations." arXiv preprint arXiv:2007.14433 (2020). (Year: 2020).*

Tsoumakas, Grigorios, Ioannis Katakis, and Ioannis Vlahavas. "Effective and efficient multilabel classification in domains with large number of labels." Proc. ECML/PKDD 2008 Workshop on Mining Multidimensional Data (MMD'08). vol. 21. 2008. (Year: 2008).

Similarity-based Multi-label Learning taken from https://arxiv.org/pdf/1710.10335v1 .pdf (Year: 2017).

MI-knn: A Lazy Learning Approach toMulti-Label Learning taken from http://citeseerx.ist.psu.edu/viewdoc/download?doi=10.1.1.89. 7148&rep=rep1&type=pdf (Year: 2007).

Score Normalization and Aggregation for Active Learning in Multi-label Classification taken from https://www.researchgate.net/publication/222089355_Score_Normalization_and_Aggregation_for_Active_Learningjn_Multi-label_Classification (Year: 2010).

ML-CLUBAS: A Multi Label Bug Classification Algorithm taken from https://file.scirp.org/Html/2-9301529_26203.htm (Year: 2012).

A Fuzzy Similarity-Based Approach for Multi-label Document Classification taken from https://www.researchgate.net/publication/232625068_A_Fuzzy_Similarity-Based_Approach_for_Multi-labeLDocument_Classification (Year: 2009).

Madhieh Abbasi et al. "Robustness to Adversarial Examples Through and Ensemble of Specialists" Computer Vision and Systems Laboratory, Electrical and Computer Engineering Department Universite Laval, Quebec, Canada, Mar. 10, 2017.

Naveed Akhtar et al. "Threat of Adversarial Attacks on Deep Learning in Computer Vision: A Survey", School of Computer Science and Software Engineering, University of Western Australia, Feb. 26, 2018.

Maria-Florina Balcan et al. "Agnostic Active Learning", Jun. 13, 2008.

Alexander Bagnall et al. "Training Ensembles to Detect Adversarial Examples", Dec. 11, 2017.

Battista Biggio et al. "Wild Patterns: Ten Years After the Rise of Adversarial Machine Learning", Jul. 19, 2018.

Anirban Chakraborty et al. "Adversarial Attacks and Defences: A Survey", Sep. 28, 2018.

Nicholas Carlini et al. "Towards Evaluating the Robustness of Neural Networks", Mar. 22, 2017.

Yoav Freund et al. "Selective Sampling Using the Query by Committee Algorithm", Machine Learning, 28, 133-168 (1997), 1997 Kluwer Academic Publishers.

Ian J. Goodfellow et al. "Explaining and Harnessing Adversarial Examples", Mar. 20, 2015.

Steve Hanneke "Rates of Convergence in Active Learning", The Annals of Statistics, 2011, vol. 39, No. 1, 333-361, nstitute of Mathematical Statistics, 2011.

Haym Hirsh "Theoretical Underpinnings of Version Spaces", Computer Science Department Rutgers University, tew Brunswick, NJ.

Ralf Herbrich et al. "Bayes Point Machines", 2001.

Kebana "Robust Arrangements of Classifiers in Version Space".

Qiang Liu "A Survey on Security Threats and Defensive Techniques of Machine Learning: A Data Driven View", IEEE Feb. 2018.

Yu Li "On the Decision Boundary of Deep Neural Networks", Jan. 1, 2019.

Tessa Lau "Programming by Demonstration Using Version Space Algebra", Machine Learning, 53,111-156, 2003.

Tom M. Mitchell "Generalization as Search", Computer Science Department, Rutgers University.

Seyed-Mohsen Moosavi-Dezfooli "DeepFool: a simple and accurate method to fool deep neural networks" Jul. 4, 2016.

Aamir Mustafa "Adversarial Defense by Restricting the Hidden Space of Deep Neural Networks" Jul. 28, 2019.

Nicolas Papernot "Distillation as a Defense to Adversarial Perturbations against Deep Neural Networks" IEEE 2016, Mar. 14, 2016.

Shantanu Rane"A Version Space Perspective on Differentially Private Pool-Based Active Learning", Downloaded Aug. 28, 2020.

Daniel Soudry "The Implicit Bias of Gradient Descent on Separable Data", Journal of Machine Learning Research 19(2018), Dec. 28, 2018.

Uiawei Su "One Pixel Attach for Fooling Deep Neural Networks" Oct. 17, 2019.

Yichuan Tang "Deep Learning using Linear Support Vector Machines", Feb. 21, 2015.

Simon Tong "Support Vector Machine Active Learning with Applications to Text Classification", Journal of Machine .Learning Research (2001).

Florian Tramer "Ensemble Adversarial Training: Attacks and Defenses" ICLR 2018, Apr. 26, 2020.

Yan Zhou "Breaking Transferability of Adversarial Samples with Randomness", Jun. 17, 2018.

* cited by examiner

From FIG. 3

INCREASE, BASED ON THE OBTAINED ENSEMBLE OF CLASSIFIERS, AN ACCURACY IN CLASSIFICATION OF A SET OF TEST DATA WHICH HAS BEEN MODIFIED BASED ON PERTURBATION-BOUNDED EVASION ATTACKS OR OTHER ADVERSARIAL TECHNIQUES — 312

OPTIMIZE SHAPE PARAMETERS OF THE UNIVERSAL KERNEL FOR EACH RESPECTIVE CLASSIFIER BASED ON THE PREDICTED OUTCOME, WHEREIN THE SHAPE PARAMETERS INDICATE A SIZE AND ECCENTRICITY OF A SHAPE ASSOCIATED WITH EACH RESPECTIVE CLASSIFIER — 314

RETURN

FIG. 3 CONT.

Clean data, Random shuffling, Gaussian regression, γ = 30

| | | Class Number | | | | | | | | | |
|---|---|---|---|---|---|---|---|---|---|---|---|
| Overall | 0 | 1 | 2 | 3 | 4 | 5 | 6 | 7 | 8 | 9 | |
| 97.650 | 99.082 | 99.119 | 96.318 | 97.228 | 97.862 | 97.758 | 97.808 | 97.276 | 97.741 | 96.234 | |
| 97.800 | 99.082 | 99.383 | 96.996 | 97.129 | 97.760 | 98.206 | 98.121 | 97.276 | 97.947 | 96.036 | |
| 97.710 | 98.980 | 99.207 | 97.287 | 97.723 | 97.556 | 97.870 | 98.121 | 96.401 | 97.844 | 96.036 | |
| 97.750 | 98.980 | 99.295 | 96.996 | 97.426 | 97.963 | 98.206 | 98.225 | 96.401 | 98.152 | 95.837 | |
| 97.730 | 98.878 | 99.295 | 97.190 | 97.525 | 97.760 | 97.534 | 98.434 | 96.693 | 98.152 | 95.738 | |
| 97.780 | 99.082 | 99.295 | 97.093 | 97.525 | 97.760 | 98.094 | 98.225 | 97.082 | 97.639 | 95.937 | |
| 97.690 | 98.878 | 99.295 | 97.190 | 97.327 | 97.963 | 97.534 | 98.225 | 96.984 | 97.741 | 95.837 | |
| 97.670 | 98.878 | 99.119 | 96.899 | 97.822 | 97.862 | 98.206 | 98.121 | 96.304 | 97.741 | 95.639 | |
| 97.800 | 98.980 | 99.383 | 97.578 | 97.723 | 97.862 | 98.094 | 98.121 | 96.887 | 97.536 | 95.738 | |
| 97.670 | 98.980 | 99.207 | 96.899 | 97.426 | 97.862 | 97.870 | 98.539 | 96.693 | 97.947 | 95.243 | |
| Majority | | | | | | 97.930 | | | | | |

FIG. 4A

Clean data, Class membership, Gaussian regression, γ = 30

| Overall | \ | Class Number | | | | | | | | | |
|---|---|---|---|---|---|---|---|---|---|---|---|
| | | 0 | 1 | 2 | 3 | 4 | 5 | 6 | 7 | 8 | 9 |
| 92.310 | | 58.878 | 99.119 | 95.640 | 95.644 | 95.825 | 95.628 | 97.182 | 94.261 | 95.688 | 94.153 |
| 89.740 | | 96.735 | 97.181 | 87.306 | 90.495 | 91.650 | 80.381 | 91.754 | 89.981 | 84.292 | 85.828 |
| 94.920 | | 98.469 | 99.207 | 82.267 | 94.950 | 96.436 | 95.852 | 97.286 | 95.331 | 94.661 | 94.846 |
| 95.260 | | 97.959 | 99.031 | 95.349 | 88.119 | 96.029 | 95.852 | 96.868 | 94.942 | 94.661 | 93.558 |
| 94.890 | | 98.878 | 98.855 | 93.508 | 95.347 | 90.631 | 91.592 | 96.660 | 94.553 | 94.353 | 93.756 |
| 95.120 | | 98.571 | 98.855 | 95.446 | 94.752 | 96.029 | 83.744 | 97.495 | 94.261 | 96.099 | 94.450 |
| 94.150 | | 98.673 | 98.855 | 93.508 | 94.752 | 94.094 | 92.040 | 88.831 | 94.066 | 93.429 | 92.270 |
| 94.140 | | 98.776 | 98.678 | 91.957 | 93.960 | 95.010 | 92.713 | 96.660 | 89.786 | 91.273 | 92.170 |
| 95.510 | | 98.878 | 98.943 | 95.349 | 95.248 | 96.741 | 96.076 | 97.808 | 95.525 | 85.626 | 94.450 |
| 94.900 | | 98.163 | 99.031 | 93.508 | 93.168 | 96.029 | 93.946 | 97.495 | 93.969 | 93.532 | 89.792 |
| Majority | | | | | | 96.200 | | | | | |

FIG. 4B

FGM attack, Random shuffling, Gaussian regression, $\gamma = 10$

| | | | | | Class Number | | | | | |
|---|---|---|---|---|---|---|---|---|---|---|
| Overall | 0 | 1 | 2 | 3 | 4 | 5 | 6 | 7 | 8 | 9 |
| 59.740 | 81.531 | 36.123 | 76.260 | 63.366 | 51.731 | 60.538 | 77.244 | 56.128 | 56.674 | 41.724 |
| 59.640 | 82.449 | 31.366 | 75.872 | 63.861 | 51.324 | 61.996 | 75.365 | 58.463 | 58.419 | 41.923 |
| 60.390 | 82.449 | 33.216 | 75.678 | 64.455 | 54.073 | 64.013 | 74.008 | 58.268 | 59.138 | 43.211 |
| 60.060 | 82.653 | 35.507 | 75.388 | 62.772 | 51.120 | 61.547 | 76.618 | 59.436 | 58.111 | 41.526 |
| 59.080 | 82.551 | 28.634 | 73.934 | 63.267 | 56.008 | 62.332 | 74.113 | 58.560 | 56.879 | 39.643 |
| 60.290 | 82.347 | 37.533 | 74.419 | 63.366 | 54.073 | 62.556 | 75.678 | 59.047 | 57.598 | 40.238 |
| 60.410 | 82.653 | 40.264 | 75.388 | 62.079 | 50.713 | 65.247 | 76.200 | 58.852 | 55.852 | 40.634 |
| 60.510 | 82.551 | 35.419 | 76.163 | 64.653 | 52.240 | 63.004 | 77.349 | 57.490 | 57.803 | 42.716 |
| 59.540 | 82.551 | 32.775 | 75.291 | 65.743 | 51.731 | 62.780 | 74.948 | 59.630 | 54.415 | 39.941 |
| 59.460 | 80.714 | 34.626 | 74.322 | 63.960 | 51.426 | 63.789 | 75.783 | 56.615 | 56.776 | 41.031 |
| Majority | | | | | 61.080 | | | | | |

FIG. 5A

PGD attack, Random shuffling, Gaussian regression, γ = 10

| Overall | 0 | 1 | 2 | 3 | 4 | 5 | 6 | 7 | 8 | 9 |
|---|---|---|---|---|---|---|---|---|---|---|
| 59.310 | 88.469 | 46.432 | 78.198 | 62.277 | 44.705 | 63.677 | 81.837 | 41.926 | 59.035 | 30.129 |
| 59.750 | 86.939 | 44.405 | 77.229 | 63.564 | 47.149 | 63.341 | 78.392 | 47.665 | 59.959 | 32.408 |
| 61.600 | 89.184 | 52.599 | 78.488 | 66.139 | 46.945 | 64.910 | 76.305 | 48.249 | 60.062 | 35.580 |
| 60.070 | 86.837 | 51.806 | 79.167 | 63.168 | 45.723 | 62.220 | 79.436 | 46.693 | 58.419 | 29.633 |
| 60.870 | 89.388 | 51.718 | 76.066 | 63.168 | 49.491 | 60.668 | 77.244 | 49.903 | 57.290 | 34.192 |
| 60.800 | 87.245 | 50.661 | 78.101 | 62.871 | 47.862 | 63.117 | 78.497 | 50.486 | 59.446 | 32.309 |
| 58.410 | 89.184 | 36.035 | 78.488 | 60.396 | 45.927 | 67.265 | 79.019 | 47.276 | 55.441 | 30.129 |
| 61.650 | 88.776 | 48.811 | 79.264 | 64.752 | 48.473 | 65.807 | 82.046 | 46.012 | 60.678 | 35.282 |
| 60.200 | 88.367 | 51.630 | 76.841 | 66.139 | 47.251 | 63.229 | 77.871 | 48.833 | 54.517 | 29.732 |
| 60.170 | 88.469 | 54.449 | 75.969 | 62.574 | 45.112 | 64.013 | 79.019 | 46.206 | 57.392 | 30.823 |
| Majority | | | | | 60.080 | | | | | |

FIG. 5B

FGM attack, Random shuffling, Gaussian SVM, γ = 35

| | | | | | Class Number | | | | | |
|---|---|---|---|---|---|---|---|---|---|---|
| Overall | 0 | 1 | 2 | 3 | 4 | 5 | 6 | 7 | 8 | 9 |
| 27.700 | 22.347 | 0.000 | 92.539 | 10.693 | 0.509 | 85.987 | 1.670 | 64.689 | 3.491 | 0.099 |
| 24.480 | 1.020 | 0.000 | 96.802 | 18.713 | 69.246 | 41.928 | 13.466 | 4.699 | 1.951 | 0.000 |
| 33.080 | 87.755 | 0.000 | 94.089 | 6.634 | 60.896 | 50.000 | 0.000 | 32.685 | 2.772 | 0.297 |
| 34.010 | 68.265 | 0.000 | 93.798 | 6.733 | 1.935 | 71.637 | 23.382 | 59.533 | 19.199 | 1.487 |
| 39.360 | 27.755 | 7.048 | 85.853 | 19.406 | 75.764 | 61.547 | 84.134 | 25.681 | 14.066 | 0.198 |
| 41.860 | 22.551 | 0.000 | 89.244 | 46.733 | 64.155 | 59.081 | 80.793 | 48.054 | 14.990 | 0.099 |
| 30.820 | 6.531 | 0.000 | 70.446 | 28.812 | 27.699 | 95.067 | 41.127 | 22.763 | 25.770 | 0.099 |
| 34.310 | 14.490 | 0.000 | 86.725 | 30.495 | 31.568 | 88.117 | 18.894 | 48.541 | 28.747 | 2.973 |
| 24.140 | 0.204 | 0.000 | 94.961 | 3.960 | 18.228 | 76.906 | 2.296 | 46.984 | 2.259 | 0.000 |
| 16.650 | 9.082 | 0.088 | 15.407 | 1.287 | 4.888 | 99.103 | 36.326 | 1.167 | 11.396 | 0.000 |
| Majority | | | | | 32.710 | | | | | |

PGD, Random shuffling, Gaussian SVM, γ = 35

| Overall | Class Number | | | | | | | | | |
|---|---|---|---|---|---|---|---|---|---|---|
| | 0 | 1 | 2 | 3 | 4 | 5 | 6 | 7 | 8 | 9 |
| 48.830 | 58.469 | 10.661 | 88.663 | 42.376 | 26.884 | 87.668 | 59.081 | 84.241 | 29.158 | 8.325 |
| 44.090 | 31.939 | 9.780 | 92.248 | 50.198 | 80.448 | 71.300 | 66.284 | 30.350 | 11.910 | 3.667 |
| 47.610 | 86.837 | 8.634 | 91.085 | 36.931 | 61.303 | 80.157 | 28.184 | 55.447 | 26.181 | 8.622 |
| 51.230 | 68.367 | 10.925 | 88.275 | 39.802 | 27.189 | 79.709 | 70.772 | 81.907 | 43.737 | 9.118 |
| 55.630 | 58.265 | 60.441 | 79.748 | 45.050 | 70.061 | 74.888 | 82.255 | 44.553 | 36.345 | 7.136 |
| 53.410 | 52.857 | 24.053 | 83.140 | 64.059 | 68.228 | 58.632 | 80.793 | 66.926 | 36.037 | 3.865 |
| 49.760 | 38.061 | 20.617 | 82.558 | 51.683 | 56.008 | 85.314 | 67.745 | 53.405 | 46.612 | 3.171 |
| 51.240 | 49.592 | 21.586 | 85.756 | 54.851 | 46.945 | 77.803 | 57.620 | 69.553 | 47.023 | 7.334 |
| 47.410 | 32.551 | 24.493 | 90.213 | 35.149 | 48.574 | 87.220 | 61.691 | 75.778 | 16.940 | 6.739 |
| 49.660 | 57.143 | 51.278 | 59.496 | 30.594 | 56.314 | 95.740 | 66.180 | 32.977 | 51.848 | 1.586 |
| Majority | | | | | 53.290 | | | | | |

FIG. 5D

FGM attack, Class membership, Gaussian regression, γ = 10

| Overall | Class Number | | | | | | | | | |
|---|---|---|---|---|---|---|---|---|---|---|
| | 0 | 1 | 2 | 3 | 4 | 5 | 6 | 7 | 8 | 9 |
| 56.720 | 8.163 | 77.797 | 50.969 | 59.505 | 49.796 | 66.256 | 77.766 | 63.911 | 58.624 | 52.428 |
| 43.090 | 2.347 | 0.529 | 54.264 | 59.406 | 46.945 | 51.233 | 69.624 | 59.728 | 45.791 | 47.076 |
| 50.770 | 74.388 | 40.441 | 1.938 | 71.980 | 48.473 | 41.143 | 74.635 | 60.117 | 53.388 | 44.202 |
| 50.160 | 75.612 | 42.203 | 75.678 | 0.990 | 42.261 | 60.762 | 65.971 | 62.160 | 48.973 | 29.732 |
| 51.840 | 66.939 | 47.137 | 60.174 | 53.465 | 0.611 | 52.578 | 75.052 | 65.467 | 52.669 | 44.797 |
| 50.120 | 78.571 | 42.291 | 48.643 | 70.891 | 50.000 | 0.561 | 65.553 | 63.230 | 51.848 | 26.264 |
| 52.370 | 82.143 | 68.106 | 69.089 | 46.238 | 54.684 | 58.408 | 2.818 | 53.988 | 51.643 | 33.300 |
| 47.170 | 81.735 | 28.370 | 71.802 | 60.297 | 54.175 | 50.336 | 48.225 | 3.696 | 42.608 | 34.490 |
| 53.690 | 69.592 | 46.520 | 65.698 | 60.099 | 55.804 | 60.987 | 69.624 | 69.358 | 0.411 | 39.445 |
| 55.390 | 82.347 | 50.661 | 51.841 | 69.307 | 65.479 | 50.561 | 66.180 | 67.412 | 48.871 | 2.478 |
| Majority | | | | | 62.740 | | | | | |

FIG. 6A

PGD attack, Class membership, Gaussian regression, γ = 10

| Overall | 0 | 1 | 2 | 3 | 4 | 5 | 6 | 7 | 8 | 9 |
|---|---|---|---|---|---|---|---|---|---|---|
| 60.630 | 5.102 | 92.335 | 50.097 | 64.554 | 49.491 | 67.937 | 82.463 | 63.132 | 70.534 | 57.284 |
| 45.170 | 3.163 | 0.793 | 58.043 | 61.386 | 53.157 | 45.964 | 75.678 | 56.907 | 53.901 | 48.662 |
| 51.950 | 80.204 | 53.921 | 1.260 | 72.079 | 41.853 | 40.695 | 78.497 | 46.304 | 61.910 | 44.698 |
| 54.670 | 81.531 | 60.793 | 80.911 | 0.990 | 34.216 | 61.099 | 70.981 | 52.237 | 64.476 | 40.337 |
| 58.060 | 72.857 | 74.802 | 64.535 | 55.149 | 1.731 | 52.691 | 79.436 | 64.981 | 64.476 | 47.175 |
| 56.210 | 84.694 | 73.480 | 53.004 | 71.089 | 37.067 | 0.785 | 69.520 | 56.615 | 62.320 | 46.184 |
| 56.180 | 88.265 | 80.176 | 69.089 | 55.842 | 54.175 | 60.538 | 0.731 | 44.844 | 66.735 | 37.265 |
| 50.620 | 87.449 | 51.013 | 78.004 | 64.851 | 46.945 | 46.861 | 50.939 | 2.724 | 49.076 | 29.039 |
| 58.030 | 79.490 | 77.269 | 65.116 | 65.941 | 49.287 | 63.229 | 69.937 | 54.767 | 1.540 | 50.842 |
| 60.460 | 84.796 | 82.819 | 53.876 | 72.079 | 59.369 | 53.027 | 71.816 | 66.634 | 55.031 | 2.577 |
| Majority | | | | | 66.230 | | | | | |

FIG. 6B

FGM attack, Class membership, Gaussian regression, γ = 35

640

| | Class Number | | | | | | | | | |
|---|---|---|---|---|---|---|---|---|---|---|
| Overall | 0 | 1 | 2 | 3 | 4 | 5 | 6 | 7 | 8 | 9 |
| 18.710 | 0.000 | 5.463 | 83.430 | 3.168 | 89.409 | 0.000 | 0.000 | 3.502 | 0.205 | 0.000 |
| 15.120 | 99.898 | 0.000 | 3.779 | 1.188 | 15.682 | 0.561 | 1.670 | 28.016 | 0.616 | 1.288 |
| 19.580 | 97.449 | 0.000 | 0.000 | 0.000 | 4.175 | 9.865 | 3.340 | 81.907 | 0.000 | 0.000 |
| 19.230 | 33.776 | 0.000 | 1.260 | 0.000 | 64.257 | 0.000 | 91.754 | 6.712 | 0.000 | 0.000 |
| 13.880 | 99.592 | 0.000 | 5.329 | 33.762 | 0.000 | 1.794 | 0.000 | 0.000 | 0.000 | 0.000 |
| 15.740 | 5.714 | 0.000 | 98.256 | 0.000 | 23.014 | 0.000 | 2.610 | 24.222 | 0.000 | 0.396 |
| 24.500 | 65.204 | 0.000 | 3.779 | 92.079 | 0.000 | 0.785 | 0.000 | 81.226 | 0.000 | 0.000 |
| 19.160 | 96.122 | 0.088 | 73.353 | 9.703 | 0.000 | 5.157 | 7.203 | 0.000 | 0.308 | 0.000 |
| 13.380 | 98.367 | 0.000 | 2.713 | 0.000 | 0.204 | 0.000 | 17.641 | 17.023 | 0.000 | 0.000 |
| 11.960 | 13.469 | 0.000 | 98.934 | 4.158 | 0.000 | 0.112 | 0.000 | 0.000 | 0.000 | 0.000 |
| Majority | | | | | 21.49 | | | | | |

FIG. 6C

PGD attack, Class membership, Gaussian SVM, $\gamma = 35$

| Overall | 0 | 1 | 2 | 3 | 4 | 5 | 6 | 7 | 8 | 9 |
|---|---|---|---|---|---|---|---|---|---|---|
| 29.830 | 0.408 | 42.467 | 87.016 | 32.079 | 95.621 | 0.785 | 10.125 | 15.564 | 4.825 | 2.478 |
| 28.320 | 99.694 | 0.000 | 32.946 | 20.099 | 49.185 | 7.063 | 20.877 | 43.093 | 3.183 | 9.118 |
| 32.530 | 97.551 | 2.643 | 2.035 | 11.782 | 34.725 | 62.332 | 23.591 | 93.385 | 3.491 | 0.991 |
| 30.230 | 57.653 | 0.000 | 28.488 | 0.000 | 84.623 | 6.166 | 88.622 | 27.529 | 11.807 | 3.072 |
| 25.330 | 98.980 | 0.441 | 56.880 | 74.950 | 0.000 | 18.610 | 2.505 | 1.167 | 0.616 | 0.595 |
| 30.680 | 30.918 | 0.617 | 97.190 | 14.653 | 60.183 | 0.000 | 47.599 | 44.942 | 1.129 | 8.622 |
| 31.650 | 82.653 | 0.000 | 33.333 | 93.069 | 0.815 | 6.839 | 0.000 | 93.580 | 1.540 | 2.478 |
| 31.570 | 93.673 | 6.256 | 86.919 | 43.069 | 4.277 | 29.036 | 50.000 | 0.292 | 5.441 | 0.000 |
| 28.310 | 94.592 | 0.088 | 47.868 | 8.416 | 24.745 | 0.561 | 55.637 | 48.930 | 0.000 | 3.964 |
| 23.590 | 51.837 | 3.877 | 99.516 | 37.723 | 0.102 | 6.726 | 25.574 | 7.782 | 1.335 | 0.000 |
| Majority | | | | | 39.640 | | | | | |

FIG. 6D

METHOD AND SYSTEM FOR CREATING AN ENSEMBLE OF MACHINE LEARNING MODELS TO DEFEND AGAINST ADVERSARIAL EXAMPLES

STATEMENT OF GOVERNMENT-FUNDED RESEARCH

This invention was made with U.S. government support under (Contract No.) Award Number: HR00111990075 awarded by the Defense Advanced Research Projects Agency (DARPA). The U.S. government has certain rights in the invention.

RELATED APPLICATIONS

This application is related to U.S. application Ser. No. 17/158,631, entitled "System and Method for Reasoning About the Diversity and Robustness of an Ensemble of Classifiers," by inventors Shantanu Rane, Alejandro E. Brito, and Hamed Soroush, filed 26 Jan. 2021 (hereinafter "application. Ser. No. 17/158,631"), the disclosures of which are herein incorporated by reference in their entirety

BACKGROUND

Field

This disclosure is generally related to machine learning and data classification. More specifically, this disclosure is related to a method and system for creating an ensemble of machine learning models to defend against adversarial examples.

Related Art

In the field of machine learning, adversarial examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. For example, analyzing robustness against adversarial examples using linear models derived from convolutional neural networks (CNNs) is described in application Ser. No. 17/158,631. However, a principled analysis based on these CNN-derived linear models remains a challenge.

SUMMARY

One embodiment provides a system which facilitates construction of an ensemble of machine learning models. During operation, the system determines a training set of data objects, wherein each data object is associated with one of a plurality of classes. The system divides the training set of data objects into a number of partitions. The system generates a respective machine learning model for each respective partition using a universal kernel function, which processes the data objects divided into a respective partition to obtain the ensemble of machine learning models. The system trains the machine learning models based on the data objects of the training set. The system predicts an outcome for a testing data object based on the ensemble of machine learning models and an ensemble decision rule.

In some embodiments, dividing the training set of data objects into the number of partitions comprises dividing the training set of data objects into a number of partitions representing a number of classes of the training set of data objects, wherein a respective data object is associated with a respective partition defined by the class of the data object.

In some embodiments, dividing the training set of data objects into the number of partitions comprises dividing the training set of data objects randomly into the number of partitions.

In some embodiments, the universal kernel function comprises a Gaussian kernel function. In this disclosure, the term "universal kernel" implies universal kernel function.

In some embodiments, the ensemble decision rule is based on one or more of: a majority vote for a class by the individual models/classifiers; a maximum of an average of a probability of each class as reported by the individual models/classifiers; and a function which returns a value that can be ranked and is computed based on a likelihood score of each class as reported by the individual models/classifiers.

In some embodiments, the respective machine learning model comprises a classifier, the ensemble of machine learning models comprises an ensemble of classifiers, and predicting the outcome for the testing data object is based on the ensemble of classifiers and comprises determining a class for the testing data object.

In some embodiments, the system increases, based on the obtained ensemble of classifiers, accuracy in classification of a set of test data which has been modified based on perturbation-bounded evasion attacks or other adversarial techniques.

In some embodiments, the system optimizes shape parameters of the universal kernel for each respective classifier based on the predicted outcome, wherein the shape parameters indicate a size and eccentricity of a shape associated with each respective classifier.

In some embodiments, the system selects the number of partitions into which the training set is divided based on one or more of: a number of the plurality of classes; a random number; a similarity which can be measured on the data objects of the training set (e.g., orthogonality); and a clustering algorithm (e.g., a k-means clustering algorithm).

In some embodiments, the testing data object is modified based on an adversarial technique.

BRIEF DESCRIPTION OF THE FIGURES

FIG. 4A depicts a table indicating an exemplary confusion matrix for clean data, using a random shuffling method (an example of the random partition method) and a kernel regressor (an example of a Gaussian kernel classifier) with a variance value of 30, in accordance with an embodiment of the present application.

FIG. 4B depicts a table indicating an exemplary confusion matrix for clean data, using a class membership method (an example of a class-based partition method) and a kernel regressor (an example of a Gaussian kernel classifier) with a variance value of 30, in accordance with an embodiment of the present application.

FIG. 5A depicts a table indicating an exemplary confusion matrix for data perturbed based on a Fast Gradient Sign Method (FGM) attack (an example of a perturbation-bounded evasion attack), using a random shuffling method (an example of the random partition method) and a kernel regressor (an example of a Gaussian kernel classifier) with a variance value of 10, in accordance with an embodiment of the present application.

FIG. 5B depicts a table indicating an exemplary confusion matrix for data perturbed based on a Projected Gradient Descent (PGD) attack (an example of a perturbation-bounded evasion attack), using a random shuffling method (an example of the random partition method) and a kernel regressor (an example of a Gaussian kernel classifier) with a variance value of 10, in accordance with an embodiment of the present application.

FIG. 5C depicts a table indicating an exemplary confusion matrix for data perturbed based on an FGM attack (an example of a perturbation-bounded evasion attack), using a random shuffling method (an example of the random partition method) and a kernel support vector machine (SVM) (an example of a Gaussian kernel classifier) with a variance value of 35, in accordance with an embodiment of the present application.

FIG. 5D depicts a table indicating an exemplary confusion matrix for data perturbed based on a PGD attack (an example of a perturbation-bounded evasion attack), using a random shuffling method (an example of the random partition method) and a kernel SVM (an example of a Gaussian kernel classifier) with a variance value of 35, in accordance with an embodiment of the present application.

FIG. 6A depicts a table indicating an exemplary confusion matrix for data perturbed based on an FGM attack (an example of a perturbation-bounded evasion attack), using a class membership method (an example of a class-based partition method) and a kernel regressor (an example of a Gaussian kernel classifier) with a variance value of 10, in accordance with an embodiment of the present application.

FIG. 6B depicts a table indicating an exemplary confusion matrix for data perturbed based on a PGD attack (an example of a perturbation-bounded evasion attack), using a class membership method (an example of a class-based partition method) and a kernel regressor (an example of a Gaussian kernel classifier) with a variance value of 10, in accordance with an embodiment of the present application.

FIG. 6C depicts a table indicating an exemplary confusion matrix for data perturbed based on an FGM attack (an example of a perturbation-bounded evasion attack), using a class membership method (an example of a class-based partition method) and a kernel SVM (an example of a Gaussian kernel classifier) with a variance value of 35, in accordance with an embodiment of the present application.

FIG. 6D depicts a table indicating an exemplary confusion matrix for data perturbed based on a PGD attack (an example of a perturbation-bounded evasion attack), using a class membership method (an example of a class-based partition method) and a kernel SVM (an example of a Gaussian kernel classifier) with a variance value of 35, in accordance with an embodiment of the present application.

In the figures, like reference numerals refer to the same figure elements.

DETAILED DESCRIPTION

Figure 1:
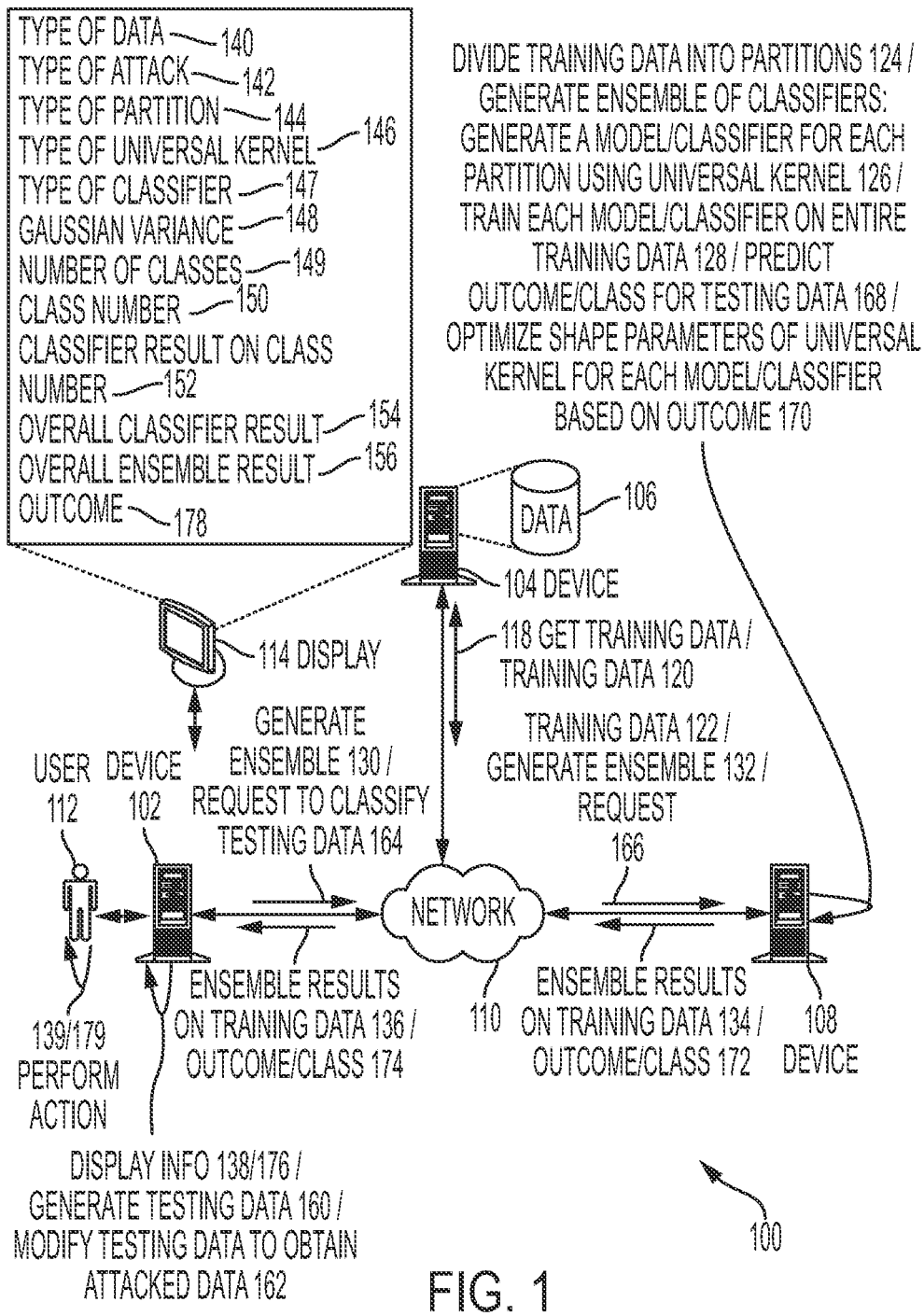
FIG. 1 presents an exemplary environment which facilitates construction of an ensemble of classifiers to defend against adversarial examples, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Introduction and Overview

The embodiments described herein solve the problem of addressing perturbation-bounded evasion attacks by providing a system which creates an ensemble of machine learning models (or classifiers) which can defend against misclassification.

As described above, adversarial machine learning examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. For example, analyzing robustness against adversarial examples using linear models derived from convolutional neural networks (CNNs) is described in application Ser. No. 17/158,631. Where a CNN learns a complicated kernel such that the data is approximately linearly separable after the kernel mapping. Because this kernel cannot be expressed in a closed form, the kernel may be difficult to analyze and providing optimal classifier constructions may also be challenging. Furthermore, one best-case scenario from the CNN-derived linear models is that they are approximations to the optimal classifier in the version space, e.g., which is the Bayes Point Machine. Thus, a principled analysis based on the CNN-derived linear models remains a challenge.

The embodiments described herein provide a system which addresses the above-described challenges by generating multiple machine learning models to obtain an ensemble of machine learning models or classifiers. The system can divide a training data set into partitions, e.g., based on random shuffling or a class membership, as described below in relation to FIG. 1. The system can generate each respective machine learning model or classifier for each respective partition of data objects based on a universal kernel while training each generated machine learning model or classifier based on all of the data objects in the overall training data set. The universal kernel can be a Gaussian kernel. These generated multiple machine learning models or classifiers can result in obtaining an ensemble of machine learning models or classifiers. The system can subsequently predict an outcome for a given testing data object (e.g., a clean image or an image under attack) based on the obtained ensemble of machine learning models or classifiers. An exemplary environment for facilitating construction or generation of an ensemble of machine learning models to defend against adversarial examples is described below in relation to FIG. 1.

Furthermore, subsequent to generating the ensemble of classifiers, the system can facilitate an increase in the accuracy of the classification of incoming test data which has been modified based on perturbation-bounded evasion attacks or other adversarial techniques. Exemplary methods for facilitating generation of an ensemble of classifiers to defend against adversarial examples are described below in relation to FIGS. 2 and 3. Exemplary ensembles with results using different partitioning methods (random shuffling or class membership), different adversarial attacks (FGM or PGD), different methods of obtaining the ensemble of classifiers (kernel regressor or kernel SVM), and different Gaussian variances are described below in relation to FIGS. 4A-B, 5A-D, and 6A-D. Based on the predicted outcome of the classification of the clean and modified test data, for each classifier ensemble, the system can also optimize shape parameters of the universal kernel function, where the shape parameters can indicate a size and eccentricity of a shape associated with each respective classifier. The universal kernel function can be a Gaussian function used by a classifier, e.g., a Gaussian kernel regressor or a Gaussian kernel support vector machine (SVM). The effect of the Gaussian variance on the kernel regressor ensemble and the kernel SVM ensemble is described below in relation to FIGS. 7A-B.

Exemplary Environment for Construction of Ensemble of Classifiers to Defend Against Adversarial Examples FIG. 1 presents an exemplary environment 100 which facilitates construction of an ensemble of classifiers to defend against adversarial examples, in accordance with an embodiment of the present application. Environment 100 can include: a device 102, an associated user 112, and an associated display screen 114; a device 104 and an associated or included storage device 106; and a device 108. Devices 102, 104, and 108 can communicate with each other via a network 110. Device 102 can be a client computing device, e.g., a laptop computer, a mobile telephone, a smartphone, a tablet, a desktop computer, and a handheld device. Devices 102, 104, and 108 can be a computing device, e.g., a server, a networked entity, and a communication device.

During operation, device 108 can request and receive from device 104 training data (not shown), and device 104 can send training data to device 108 (via a get training data 118 communication and training data 120). Device 108 can receive training data 120 (as training data 122), and perform a series of operations to construct an ensemble of classifiers to defend against adversarial examples. Upon receiving training data 122, device 108 can determine the training set of data objects. Each data object can be associated with one of a plurality of classes. Device 108 can divide the training set of data objects into a number of partitions (operation 124). This division can be based on a random shuffling method or on a class membership method, as described herein. Device 108 can generate an ensemble of classifiers, i.e.: device 108 can generate a machine learning model or classifier for each partition of the training set of data objects, using a universal kernel (operation 126). Device 108 can generate a respective machine learning model or classifier for each respective partition based on a universal kernel of training data objects divided into a respective partition, to obtain the ensemble of machine learning models or classifiers. The data objects in each partition can form the basis for the respective kernel function used to generate the respective machine learning model or classifier. These partitions do not share kernel basis, as they are generated based on the particular data objects in their respective partition.

Device 108 can train each machine learning model or classifier on the entire training set of data objects (operation 128). Each classifier can be a kernel-based classifier. Thus, for each partition i, the system can train the ith classifier using all the data objects of the training set by treating all the data objects in the partition i as the basis for the kernel. For each generated classifier in the ensemble of classifiers, each classifier is trained on the same training data but uses a different set of basis for its matrix kernel generation, based on the data objects in the corresponding or associated partition. The system can train the same model M times using different kernel matrices, which are taken either randomly or based on class membership from the training set. The mathematical form of each of the M classifiers is the same, but the content of each kernel matrix differs based on the different basis used (i.e., based on the training data in each partition). The system can learn the model by performing an optimization on the weights of the model using the full training set. Hence, the system can train a classifier multiple times with different kernel basis sets (based on the partitioned data) and can use the partitions (or subsets) to define the performance of each model or classifier.

Device 108 can send the result of the ensemble of classifiers on the training data to device 102 (as results 134). Device 102 can receive ensemble results on training data (as results 136), and can perform a display information 138 operation, which can cause to be displayed on display 114 at least: the type of data 140 (e.g., whether the data is clean or based on an adversarial attack); the type of attack 142 (if the data type is data under attack) (e.g., FGM or PGD attack); the type of partition 144 (e.g., random shuffling or class membership); the type of universal kernel 146 used to generate the ensemble of classifiers (e.g., Gaussian kernel); a type of classifier 147 used to generate the ensemble (e.g., a regressor or SVM); a Gaussian variance 148 (e.g., the Gaussian variance used in the computation of the Gaussian kernel to generate the ensemble of classifiers); a number of classes 149 (e.g., the number of classes represented in the training set); a class number 150 (e.g., numbers which each correspond to a specific class); the classifier result on a given class number 152; the overall classifier result 154 (e.g., the result of a respective classifier across all classes); the overall ensemble result 156 (e.g., as based on an ensemble decision rule such as a majority vote or a maximum of an average of a probability of each class as reported by the individual models/classifiers). As an example, display 114 can include table 400, as described below in relation to FIG. 4A. The system can display any of the information described above on display 114, in any combination, which can allow user 112 to interact with display 114 to perform additional actions.

User 112 can view the information displayed on display 114, and can perform an action 139. For example, user 112 can change a configuration or setting related to, e.g., the type of attack (142), the type of partition (144), the type of universal kernel (146), the type of classifier (147), the Gaussian variance (148), and a number of classes (150). As another example, user 112 may interact with the information presented on display 114 to view detailed information about a specific classifier, class number, or classification. In some embodiments, user 112 can select a certain set of classifiers of the displayed or presented ensemble of classifiers (e.g., to view more detailed information), and can also generate (via a user interface widget, not shown) and send an update ensemble command to device 108 (as described in relation to application Ser. No. 17/158,631).

Furthermore, user 112, via device 102, can determine or generate a testing data set, including a testing data object (e.g., via an operation 160). The testing data set (and the testing data object) can include clean data or data which is modified by device 102 based on an adversarial technique (e.g., data under attack) (via an operation 162). Device 102 can send a corresponding request to classify the testing data (via a communication 164). Device 108 can receive the request to classify the testing data (as a request 166), and can predict an outcome/class for the testing data (operation 168). Operation 168 can include running the previously generated ensemble of classifiers on the testing data. Device 108 can also optimize shape parameters of the universal kernel for each model/classifier based on the predicted outcome (operation 170). That is, the system can learn certain parameters while learning the weights of the classifiers, which can illustrate the effect of the parameters on the robustness of the ensemble in achieving increased accuracy for classification. This can allow the system to fine-tune the parameters, iterate and use the learned parameters to provide feedback, and obtain more accurate classifiers. One exemplary parameter is the Gaussian variance, which is described below in relation to FIGS. 7A-D.

Device 108 can send a predicted outcome/class 172 to device 102. Device 102 can received predicted outcome/class 172 (as outcome/class 174), and can perform a display information 176 operation, which can cause certain information to be displayed on display 114, as described above in relation to operation 138. The information displayed on display 114 can further include an outcome 178. For example, display 114 can include any of the tables described below in relation to FIGS. 5A-D and 6A-D.

User 112 can perform an action 179, which can be similar to action 139, as described above, e.g., changing a setting, interacting with displayed information, selecting certain classifiers, and generating a command to update the ensemble based on user-configured changes.

Figure 2:
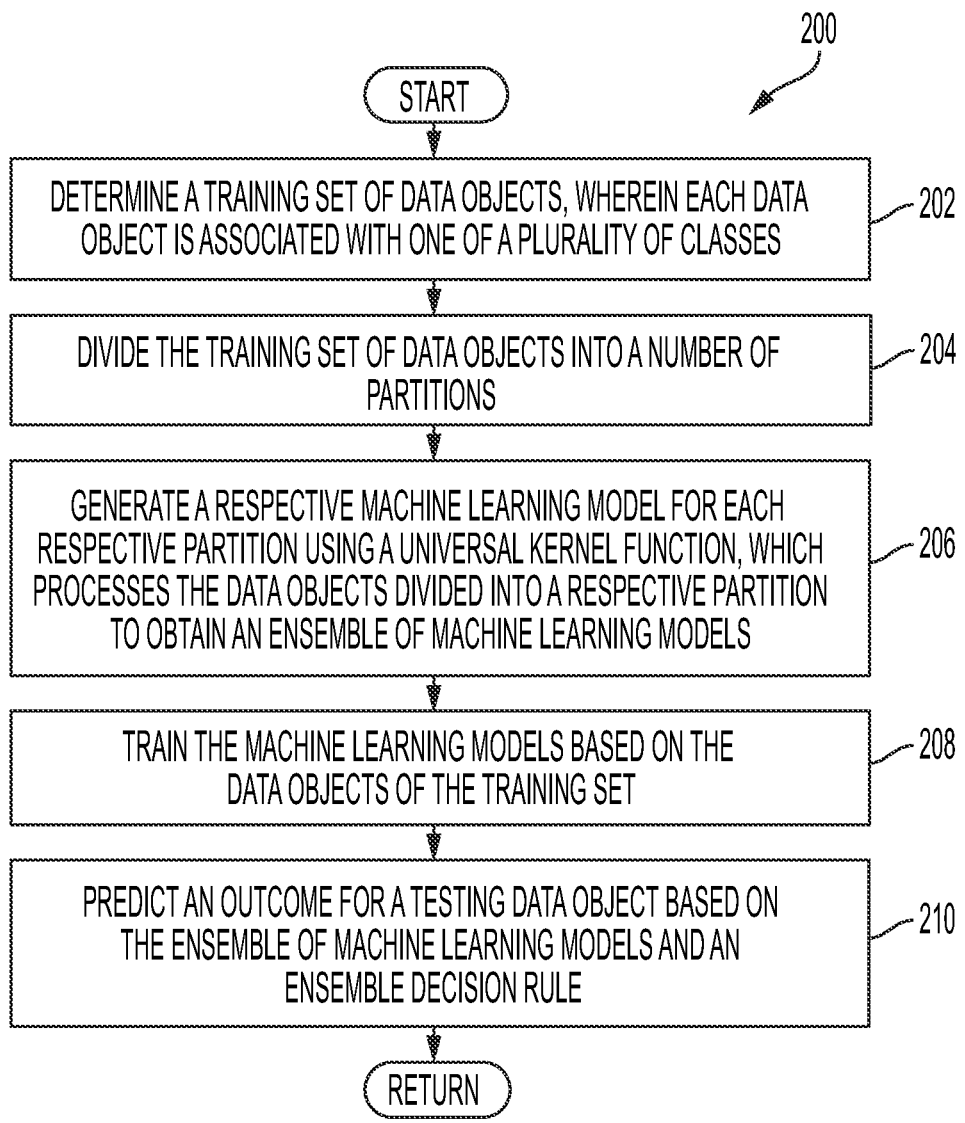
FIG. 2 presents a flowchart illustrating a method for facilitating construction of an ensemble of machine learning models to defend against adversarial examples, in accordance with an embodiment of the present application.

Exemplary Methods for Facilitating Construction of Ensemble of Classifiers to Defend Against Adversarial Examples FIG. 2 presents a flowchart 200 illustrating a method for facilitating construction of an ensemble of machine learning models to defend against adversarial examples, in accordance with an embodiment of the present application. During operation, the system determines a training set of data objects, wherein each data object is associated with one of a plurality of classes (operation 202). The system divides the training set of data objects into a number of partitions (operation 204). The system generates a respective machine learning model for each respective partition using a universal kernel function, which processes the data objects divided into a respective partition to obtain the ensemble of machine learning models (operation 206). The system trains the machine learning models based on the data objects of the training set (operation 208). The system predicts an outcome for a testing data object based on the ensemble of machine learning models and an ensemble decision rule (operation 210).

Figure 3:
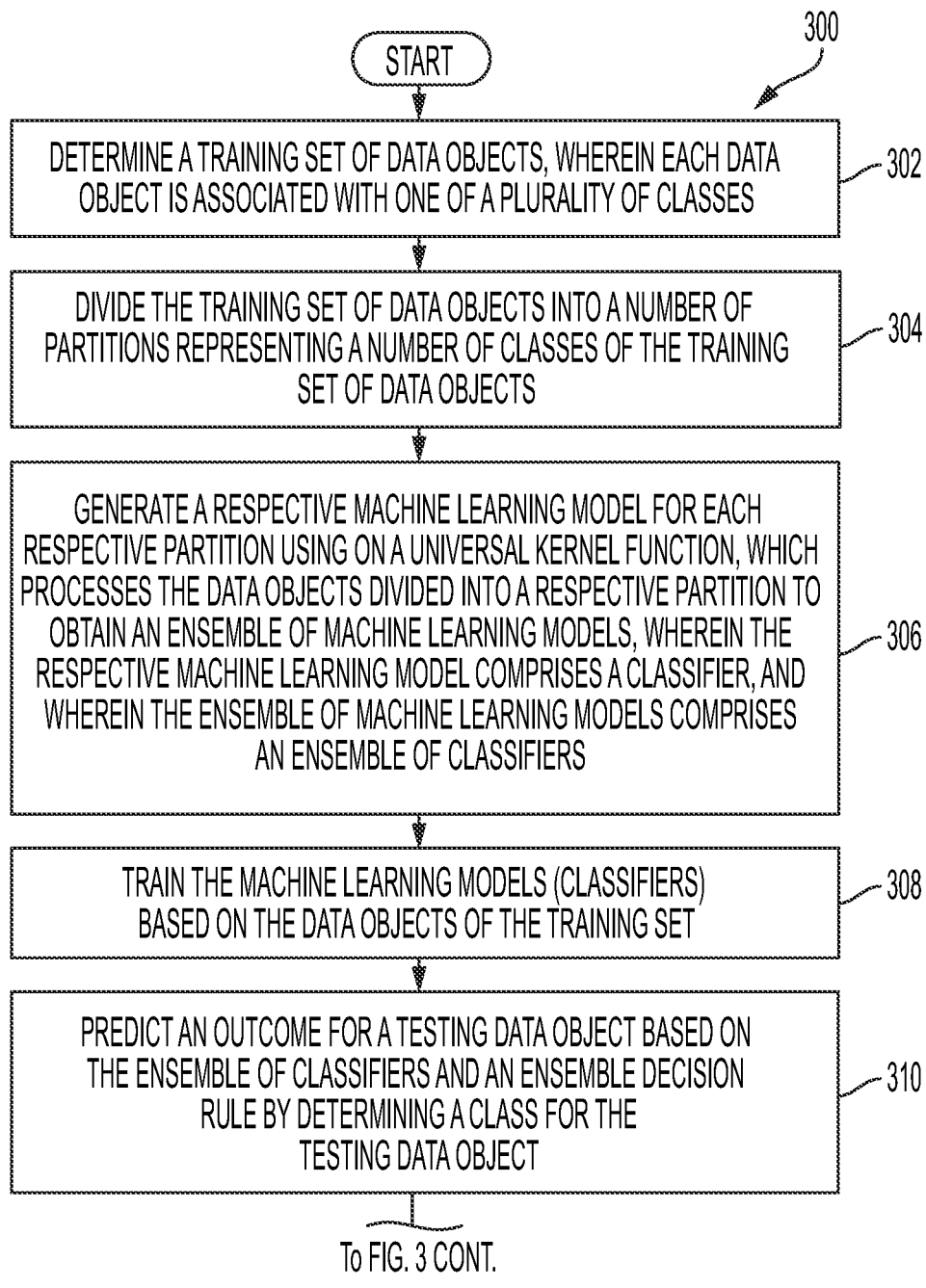
FIG. 3 presents a flowchart illustrating a method for facilitating construction of an ensemble of classifiers to defend against adversarial examples, in accordance with an embodiment of the present application.

FIG. 3 presents a flowchart 300 illustrating a method for facilitating construction of an ensemble of classifiers to defend against adversarial examples, in accordance with an embodiment of the present application. During operation, the system determines a training set of data objects, wherein each data object is associated with one of a plurality of classes (operation 302). The system divides the training set of data objects into a number of partitions representing a number of classes of the training set of data objects (operation 304). A respective data object is associated with a respective partition defined by the class of the data object. The system generates a respective machine learning model for each respective partition using a universal kernel function, which processes the data objects divided into a respective partition to obtain the ensemble of machine learning models, wherein the respective machine learning model comprises a classifier, and wherein the ensemble of machine learning models comprises an ensemble of classifiers (operation 306). The system trains the machine learning models (classifiers) based on the data objects of the training set (operation 308). The system predicts an outcome for a testing data object based on the ensemble of classifiers and an ensemble decision rule by determining a class for the testing data object (operation 310). The system increases, based on the obtained ensemble of classifiers, accuracy in classification of a set of test data which has been modified based on perturbation-bounded evasion attacks or other adversarial techniques (operation 312). The system optimizes shape parameters of the universal kernel for each respective classifier based on the predicted outcome, wherein the shape parameters indicate a size and eccentricity of a shape associated with each respective classifier (operation 314).

Constructing a Non-Linear Classifier which is Robust Against Adversarial Examples In many real-world scenarios, non-linear classifiers, such as those based on neural networks or kernel methods are used. These methods can be related. Kernel methods generally involve using a linear classifier to solve a non-linear problem. Kernel functions can use high-dimensional feature space without using or computing coordinates in high-dimensional space, and instead can compute the inner products between images of all pairs of data in a feature space. Training neural networks can be similar to training a complicated kernel, although neural networks may not be expressible in closed form. The end effect can be the same, in that neural networks, like kernel methods, can map input data into a subspace in which data is approximately linearly separable.

The described embodiments facilitate construction of non-linear classifiers which are robust to adversarial perturbations, e.g., "perturbation-bounded evasion attacks," as described above. Due to the challenges described herein associated with neural networks, the described system can use kernel methods based on Reproducing Kernel Hilbert Space (RKHS or "Hilbert space"). These RKHS-based kernel methods can facilitate approximation of any continuous and possibly non-linear classifier function, such as the Bayes classifier, with arbitrary precision using universal kernels. One example of a universal kernel is the Gaussian kernel. Furthermore, by leveraging the kernel trick, the system can apply a linear classifier after performing the kernel mapping. This can result in simplifying the theoretical analysis.

Consider a Hilbert space $\mathcal{H}$ of functions from the input space $\mathcal{X}$ to $\mathbb{R}$, i.e., $f(\mathcal{X}) \in \mathbb{R}$ for any $\mathcal{X} \in \mathcal{X}$. The Dirac evaluation functional $\delta_x$ over $\mathcal{H}$ is a linear functional given by $\delta_x: \mathcal{H} \to \mathbb{R}$, $\delta_x(f) = f(\mathcal{X})$ for any function $f \in \mathcal{H}$. In order for $\mathcal{H}$ to be a RKHS, it is assumed that $\delta_x$ is bounded for all $\mathcal{X} \in \mathcal{X}$.

Using the Riesz representation theorem, for any $x \in \mathcal{X}$, there exists a reproducing kernel function $K_x \in \mathcal{H}$ such that $f(x) = \langle f, K_x \rangle_{\mathcal{H}}$, where $\langle \bullet, \bullet \rangle_{\mathcal{H}}$ denotes the inner product of the Hilbert space and is an element of the dual space $\mathcal{H}^*$. The dual space $\mathcal{H}^*$ is the space of all continuous linear functional from $\mathcal{H} \to \mathbb{R}$. However, since the kernel $K_x$ is itself a function defined on $\mathcal{X}$, $K_x(y) \in \mathbb{R}$ for all $y \in \mathcal{X}$ and $K_x(y) = \langle K_x, K_y \rangle_{\mathcal{H}}$.

Thus, the inner product $\mathcal{X} \times \mathcal{X} \to \mathbb{R}$, can be written as a symmetric positive definite bivariate function $k(x, y) = \langle K_x, K_y \rangle_{\mathcal{H}}$. An example of such a kernel is the Gaussian kernel function given by $$k(x, y) = \exp\left(\frac{-\|x-y\|^2}{\gamma}\right),$$

where $\gamma$ is the variance. Note that $\gamma$ is used because the symbol $\sigma$ has been reserved for the adversarial perturbation, as described in application Ser. No. 17/158,631.

In general, for any symmetric and positive definite kernel $k(\bullet, \bullet): \mathcal{X} \times \mathcal{X} \to \mathbb{R}$, there exists a unique RKHS on $\mathcal{X}$ in which k is a reproducing kernel. Specifically, the RKHS $\mathcal{H}$ generated by Gaussian kernel on $\mathbb{R}^d$ is dense in the space of continuous functions on $\mathbb{R}^d$. As a result, any continuous function on $\mathbb{R}^d$ can be approximated with arbitrary precision by functions in $\mathcal{H}$.

Consider the following theorem and corresponding proof.

Representer Theorem: Consider the training set $(x_1, y_1), \ldots, (x_n, y_n) \in \mathcal{X} \times \mathbb{R}$, a RKHS $\mathcal{H}$ on the input space $\mathcal{X}$, a functional $f \in \mathcal{H}$ and a regularized empirical loss function of:

$$E = L[(y_1, f(x_1)), \ldots, (y_n, f(x_n))] + \lambda \|f\|_{\mathcal{H}}^2.$$

Then, any minimizer of E admits a representation of the form $f^*(\bullet) = \sum_{i=1}^n \alpha_i K_{x_i}(\bullet)$.

Proof: Recall that there exists a reproducing kernel function $K_{x_i}$ for every training sample $x_i$. Then, let $V = \text{span}\{K_{x_1}, \ldots, K_{x_n}\}$ so that the RKHS is given by $\mathcal{H} = V \oplus V^\perp$. We have that:

$$f = \underbrace{\sum_{i=1}^n \beta_i K_{x_i}}_{\in V} + \underbrace{f_\perp}_{\in V^\perp} \text{ and } \|f\|_{\mathcal{H}}^2 = \left\|\sum_{i=1}^n \beta_i K_{x_i}\right\|_{\mathcal{H}}^2 + \|f_\perp\|_{\mathcal{H}}^2.$$

Therefore, the orthogonal part, $f_\perp$ will always increase the norm of $f$. Now, invoking the reproducing property, for each $x_j$ in the training set we have:

$$f(x_j) = \langle f, K_{x_j} \rangle_{\mathcal{H}}$$
$$= \left\langle \sum_{i=1}^n \beta_i K_{x_i} + f_\perp, K_{x_j} \right\rangle_{\mathcal{H}}$$
$$= \left\langle \sum_{i=1}^n \beta_i K_{x_i}, K_{x_j} \right\rangle_{\mathcal{H}}$$
$$= \sum_{i=1}^n \beta_i K_{x_i}(x_j).$$

We complete the proof by noting that $f_\perp$ is not contributing to $f(x_j)$ and only increases the norm of $f$.

The above analysis can apply regardless of whether the functional $f$ is a regressor or a classifier. The $\beta_i$'s are unknown when learning the model, and the reproducing kernel matrix $K$ is obtained from the data. The Representer Theorem indicates a representation of the model as a weighted linear combination of kernels, where $K$ represents the kernels, the $\beta_i$'s represent the weights, $x_j$ represents the data, $f$ represents the classifier function (e.g., the model), $f(x_j)$ provides a label, and $K_{x_i}$ represents the kernels which are generated from the basis.

Constructing an Ensemble of Classifiers by Training on Partitions of Data

A principled approach to constructing an ensemble of classifiers in a RKHS can be based on the version space geometry, as described in application Ser. No. 17/158,631. The hyperplanes bounding the version space are the samples that are most sensitive to adversarial perturbation. These samples can, in general, belong to any of the classes. Thus, if a classifier is designed using the entire training data set, the classifier may be susceptible to adversarial perturbations (adversarial rotations, as viewed in the version space) of these sensitive hyperplanes.

To provide robustness, the described embodiments can train the classifiers on subsets (referred to as "partitions") of the training data set. As a result, the system should ensure diversity amongst the partitions, as well as amongst the classifiers training on those partitions.

One approach to determining these partitions is to divide or partition the data based on their classes, e.g., their membership in a class as given by a corresponding label ("class membership"). As a result, the system can construct the kernel basis from samples belonging to a given class, while the training is still performed on samples belonging to all classes. That is, the system can divide a training set of data objects into a number of partitions and generate a respective machine learning model for each respective partition based on a universal kernel of data objects in a respective partition, to obtain an ensemble of machine learning models or classifiers. The system can also train the respective machine learning model on all of the data objects of the training set.

The system relies on a version space view of the classifiers. Specifically, for a data set with M classes, the procedure below yields M classifiers based on the data distribution of each class. Because the data partitions are explicitly based on class membership, this approach enforces a principled notion of diversity amongst the individual classifiers. This approach can be contrasted against the general case of constructing classifier ensembles in which the data partitions are selected by randomly sampling the training data, such that each partition contains images from all classes.

Consider a set of classifiers $\mathcal{H}$ on the training set $\{(x_1, y_1), \ldots, (x_n, y_n)\} \subset \mathbb{R}^d \times \mathbb{R}$. The system objective is to find k disjoint subsets $\{\mathcal{H}_i\}_i^k$ which provide diversity for the purpose of robust classification. The goal of diversity is to ensure that if any given classifier is fooled by a particular adversarial example (i.e., misclassifies that example with high confidence), the other classifiers in the ensemble are either less likely to be fooled, or likely to misclassify that example with lower confidence.

Consider the case in which $\mathcal{H}$ is an RKHS. For the purpose of creating a diverse robust ensemble, the system objective is to find k subspaces of $\mathcal{H}$ which are approximately pairwise orthogonal. Let:

$$\mathcal{H}_i = span\left\{K_{x_{(i-1)\frac{n}{k}+1}}, \ldots, K_{x_{i\frac{n}{k}}}\right\}, i = 1, \ldots, k \quad \text{Equation (1)}$$

Then, for two arbitrary classifiers $f_1 \in \mathcal{H}_p$ and $f_2 \in \mathcal{H}_q$:

$$f_1 = \sum_{i=1}^{n/k} \alpha_i K_{u_i},$$
$$f_2 = \sum_{i=1}^{n/k} \beta_i K_{v_i}$$

where $K_{u_i}$ and $K_{v_i}$ are reproducing kernel functions based on disjoint subsets, i.e., partitions of data, we have:

$$\langle f_1, f_2 \rangle_{\mathcal{H}} = \sum_i \sum_j \alpha_i, \beta_j k(u_i, v_j)$$

The goal of diversity is that $\langle f_1, f_2 \rangle_{\mathcal{H}}$ is large when p=q and as small as possible otherwise, i.e., the orthogonality of the classifier pair is the measure of the diversity of the classifiers, and the constructions of diverse classifiers in the ensemble leads to a robust ensemble. Intuitively, this means that if two classifiers use kernels based on discriminative partitions of the training data, their predictions should have very low overlap, i.e., they should be diverse. In general, a way to construct such kernels can be achieved by performing k-means clustering on the training data to generate the kernel matrix based on the data clusters:

$$K = \begin{bmatrix} k(x_1, x_2) & \ldots & k(x_1, x_n) \\ \vdots & \ddots & \vdots \\ k(x_n, x_1) & \ldots & k(x_n, x_n) \end{bmatrix}$$

rather than using directly the matrix of inner products given by:

$$\sum = \begin{bmatrix} \langle x_1, x_2 \rangle, & \ldots & \langle x_1, x_n \rangle \\ \vdots & \ddots & \vdots \\ \langle x_n, x_1 \rangle & \ldots & \langle x_n, x_n \rangle \end{bmatrix}$$

In practice, the presence of a supervised training set, i.e., labeled training data, ensures that this type of clustering is unnecessary. For example, given a Modified National Institute of Standards and Technology (MNIST) data set, the individual data partitions can be constructed using the training data from each of ten individual classes. To construct a multi-class classifier based on the RKHS concept, the system can employ Gaussian kernels, which can approximate any continuous function in $\mathbb{R}^d$ with arbitrary precision.

—How to Construct the Multi-Class Classifier Based on Gaussian Kernels

For each class label $i \in \{1, 2, \ldots, M\}$:

(1) Construct Gaussian kernels on the data points in the class $i$.

(2) Represent data points in the training set, belonging to all classes, as a superposition of the Gaussian kernels based on samples from class label $i$, using the representation of the Representer Theorem. These data points representers belong to $\mathcal{H}_i$, as defined in Equation 1.

(3) For each class in the training set, obtain a multi-class classifier $f_i$ from data with label $i$ by finding a minimizer of the regularized empirical loss function associated with the whole training data set, as defined in Theorem 1.

The last step, namely obtaining an M-class classifier ensemble as a combination of the M kernel-based classifiers in step (3), can be achieved using two approaches.

In the first approach, each of the classifiers is a kernel-based SVM generated by using training samples of a class $i$, which maximizes the margin among samples of all the classes. This first approach can be referred to as the kernel SVM, which is the principled maximum margin counterpart of the CNN-SVM model described in application Ser. No. 17/158,631. Based on version space theory, the CNN-SVMs are approximations to this optimal kernel-based classifier. The quality of the approximation can be good when the version space is regularly shaped, because the maximum margin classifier (SVM) lies close to the centroid of the version space. However, when the version space is very eccentric, this approximation may no longer be a good approximation.

In the second approach, each of the kernel-based classifiers is a linear regressor which minimizes the regularized mean square error (MSE) loss between the classifier prediction and the label. This second approach can be referred to as the kernel regressor. Note that a linear regressor minimizing the regularized MSE loss on the Gaussian kernel space is equivalent to obtaining the optimal non-linear regressor in the Gaussian RKHS. As described above, such a regressor can approximate the optimal (Bayesian) regressor with arbitrary precision. The classification accuracy and adversarial robustness of each of these two above approaches (kernel SVM and kernel regressor) can be observed in examples of their performance shown in FIGS. 4A-B, 5A-D, and 6A-D. These two approaches can be considered as principled versions of CNN-derived classifiers.

Constructing an Ensemble of Universal Kernel Regressors Based on Partitions of Data The closed form expression to compute the weights of the multi-class classifiers can be obtained based on kernel regression. The development below can yield the weights of an M-class linear regression-based classifier with a reproducing kernel $K_x$. This can yield an ensemble, in which each component classifier of the ensemble is constructed using the below procedure. The component classifiers differ in the reproducing kernel $K_x$, which in turn, depends on the particular data partition, as described above.

Consider an M-class classifier ensemble given by:

$$C(x) = f(x) = \begin{bmatrix} f_1(x) \\ \vdots \\ f_M(x) \end{bmatrix}$$

where the $f_1$'s belong to a reproducing kernel Hilbert space $\mathcal{H}$ with reproducing kernel $K_x$. Then, from the Representer Theorem, it follows that:

$$f(x) = \begin{bmatrix} \langle f_1, K_x \rangle_{\mathcal{H}} \\ \vdots \\ \langle f_M, K_x \rangle_{\mathcal{H}} \end{bmatrix}$$

$$= \begin{bmatrix} \langle \sum_i W_{1i} K_{x_i}, K_x \rangle_{\mathcal{H}} \\ \vdots \\ \langle \sum_i W_{Mi} K_{x_i}, K_x \rangle_{\mathcal{H}} \end{bmatrix}$$

$$= \begin{bmatrix} \langle \sum_i W_{1i} K_{x_i}, K_x \rangle_{\mathcal{H}} \\ \vdots \\ \langle \sum_i W_{Mi} K_{x_i}, K_x \rangle_{\mathcal{H}} \end{bmatrix}$$

$$= \begin{bmatrix} \sum_i W_{1i} k(x_i, x) \\ \vdots \\ \sum_i W_{Mi} k(x_i, x) \end{bmatrix} = W_{M \times n} k_{n \times 1}(x)$$

The regularized loss function for the regressor, computed over the training set, can be given by:

$$L_C(W) = \frac{1}{n} \sum_{i=1}^{n} \|f(x_i) - y_i\|^2 + \lambda \sum_{j=1}^{M} \|f_j\|_{\mathcal{H}}^2$$

$$= \frac{1}{n} \sum_{i=1}^{n} \|Wk(x_i) - y_i\|^2 + \lambda \sum_{j=1}^{M} Tr[\omega_j^T K \omega_j]$$

$$= \frac{1}{n} \|WK - Y\|_F^2 + \lambda \|W\sqrt{K}\|_F^2$$

$$= \frac{1}{n} \left\| \left[ \frac{K}{\sqrt{\lambda n K}} \right] w^T - \begin{bmatrix} Y^T \\ 0_{n \times M} \end{bmatrix} \right\|_F^2$$

where is the Frobenius norm and $K=[k(x_1), \ldots, k(x_n)]$. Then, the minimizer of the loss function can be given by:

$$W_{opt}^T = \left( \left[ \frac{K}{\sqrt{\lambda n K}} \right] \right)^\dagger \begin{bmatrix} Y^T \\ 0 \end{bmatrix}$$

$$= (K + \lambda I)^{-1} Y^T.$$

Thus, at inference or prediction time, the result is:

$$C(x_{test}) = f(x_{test}) = W_{opt} k(x_{test})$$

Concrete Results on Ways to Construct Ensembles of Kernel-Based Models

The following examples provide a description of how a constructed ensemble of diverse classifiers provides robustness to defend against adversarial examples. An adversarial example can be, e.g., an image which has been perturbed in such a way that a classifier will misclassify the image, even if the perturbation is extremely small, such as a single point. The following examples demonstrate that by creating an ensemble of diverse classifiers, given an adversarial example, some of the classifiers may be fooled while a majority may not be fooled.

The exemplary tables in FIGS. 4A-B, 5A-D, and 6A-D demonstrate a practical and concrete application for the described embodiments. The system can display any such tables (and other information) on a display screen for the user, as part of an interactive display and process, as described above in relation to environment 100 of FIG. 1. The effect of the robustness of a created ensemble on both clean data and perturbed data (e.g., data under attack) is provided. Note that the FGM and PGD attacks are used merely as an example to demonstrate the robustness of the ensembles, particularly in the context of perturbation-bounded gradient-based attacks. Other attack methods or techniques may be used. The exemplary tables further demonstrate that the accuracy of classification may depend on the structure of the underlying data. If the data has no underlying or known structure, using the random shuffling method may yield accurate results, this process does create diverse classifiers since no data partition is the same, but may not be as diverse as the case where the underlying data has discriminatory classes. However, if the underlying data has structure (e.g., known discriminative corresponding classes or class labels or "class membership"), using the class membership method may yield even more accurate results. Furthermore, the kernel regressor ensembles may provide more accurate classification results than the kernel SVM ensembles, as depicted by the below examples.

—Exemplary Accuracy of Classifiers and Ensemble of Classifiers on Clean Data: Random Shuffling and Class Membership Assume a subset of training data set with representatives of all the classes can include 30,000 images, which comprises clean data (i.e., does not include any images which have been subjected to perturbation-bounded evasion attacks). FIG. 4A depicts a table 400 indicating an exemplary confusion matrix for clean data, using a random shuffling method (an example of the random partition method) and a kernel regressor (an example of a Gaussian kernel classifier) with a variance value of 30, in accordance with an embodiment of the present application. In the scenario shown in table 400, the full set of training data can be divided based on random shuffling into 10 partitions of 6,000 images per partition. Each row can represent the performance of a classifier on a given class, and each class can be indicated with a number (e.g., 0-9) per column. For example, a row 402 can indicate a first classifier which is: 99.082% accurate in identifying data from class "0" (in a column 406); 99.119% accurate in identifying data from class "1" (in a column 408); and 96.318% accurate in identifying data from class "2" (in a column 410).

The "Overall" number (in a column 404) can indicate an average of the entire row (e.g., the average accuracy of the classifier in row 402 over all of the classes 0-9). For example, row 402 can indicate that this corresponding classifier has an overall accuracy of 97.650% (in column 404). The system can provide the result of the majority ensemble rule, as shown by a majority 412 row which indicates a value of 97.930% (in an element 414). It can be noted that in table 400, the majority rule (97.930%) is a higher accuracy than the accuracy of any of the individual classifiers (as seen in column 404).

This can result in ten individual classifiers, where each individual classifier is trained based on kernel regression (e.g., a Gaussian kernel with a variance of $\gamma=30$) for the images in its partition, and where each classifier is also trained on all 30,000 images from a subset of the training data set with representative samples of all classes. Given clean data, the system can obtain an ensemble of these ten classifiers, which can result in an accuracy of 97.930% for the ensemble classifier based on a majority decision rule when the predictions are computed for a test data set of 10,000 images that are not in the training data set.

FIG. 4B depicts a table 450 indicating an exemplary confusion matrix for clean data, using a class membership method (an example of a class-based partition method) and a kernel regressor (an example of a Gaussian kernel classifier) with a variance value of 30, in accordance with an embodiment of the present application. In the scenario shown in table 450, the training data can be divided based on class membership into 10 partitions of approximately 6,000 images per partition. This can result in 10 individual classifiers, where each individual classifier is trained based on kernel regression (e.g., a Gaussian kernel with a variance of $\gamma=30$) for the images in its partition, and where each classifier is also trained on the subset of 30,000 images from all classes. Given clean data, the system can obtain an ensemble of these 10 classifiers, which can result in an accuracy of 96.200% for the ensemble classifier based on a majority decision rule when the predictions are computed for a test data set of 10,000 images that are not in the training data set. For clean data, for both individual classifiers and the ensemble of classifiers, the class membership method can result in a slightly lower accuracy on clean data than the random shuffling method. As described below, this trend may be reversed in the scenario of attacked images.

These scenarios based on kernel SVMs can yield similar results given clean data, and are not described in detail herein.

—Exemplary Accuracy of Classifiers and Ensemble of Classifiers on Adversarial Images: Random Shuffling Method (Kernel Regression and Kernel SVM)

FIG. 5A depicts a table 500 indicating an exemplary confusion matrix for data perturbed based on an FGM attack (an example of a perturbation-bounded evasion attack), using a random shuffling method (an example of the random partition method) and a kernel regressor (an example of a Gaussian kernel classifier) with a variance value of 10, in accordance with an embodiment of the present application. FIG. 5B depicts a table 520 indicating an exemplary confusion matrix for data perturbed based on a PGD attack (an example of a perturbation-bounded evasion attack), using a random shuffling method (an example of the random partition method) and a kernel regressor (an example of a Gaussian kernel classifier) with a variance value of 10, in accordance with an embodiment of the present application. In the scenarios shown in FIGS. 5A and 5B, assume that the same test data set of 10,000 images, which are not in the training data set and considered for the accuracy of FIGS. 4A-B, have been subjected to an FGM (table 500 of FIG. 5A) or PGD (table 520 FIG. 5B) attack with a perturbation budget e=0.3, and that the training data set applied to create the classifier ensemble is partitioned based on random shuffling. Given the ten individual classifiers, each individual classifier is trained based on kernel regression (e.g., a Gaussian kernel with a variance of $\gamma=10$) for the images in its partition, and where each classifier is also trained on the subset of 30,000 images from all classes. A more pronounced difference may occur between the performance of the individual classifiers, which may be expected because the random shuffling method does not enforce any significant diversity between the individual classifiers. In table 500, the majority rule (61.080%, as shown in an element 504) is a higher accuracy than the accuracy of any of the individual classifiers (as seen in a column 502). Furthermore, all of the individual classifiers may be more accurate for a first set of the ten classes and less accurate for a second set of the ten classes, and may result in an intermediate performance for the other classes. In other words, the ensemble of classifiers may have poor diversity.

FIG. 5C depicts a table 540 indicating an exemplary confusion matrix for data perturbed based on an FGM attack (an example of a perturbation-bounded evasion attack), using a random shuffling method (an example of the random partition method) and a kernel SVM (an example of a Gaussian kernel classifier) with a variance value of 35, in accordance with an embodiment of the present application. FIG. 5D depicts a table 560 indicating an exemplary confusion matrix for the test data set, which is perturbed based on a PGD attack (an example of a perturbation-bounded evasion attack), using a random shuffling method (an example of the random partition method) and a kernel SVM (an example of a Gaussian kernel classifier) with a variance value of 35, in accordance with an embodiment of the present application. The kernel SVM is an alternative kernel-based method which may not be optimal, and is presented in order to demonstrate a comparison with the more optimal diverse and robust ensemble (i.e., the kernel regressor with data partitioning).

In the scenarios shown in FIGS. 5C and 5D, assume that the same test data set of 10,000 images, which are not in the training data set and considered for the accuracy of FIGS. 4A-B, have been subjected to an FGM (table 540 of FIG. 5C) or PGD (table 560 of FIG. 5D) attack with a perturbation budget e=0.3, and that the training data set applied to create the classifier ensemble is partitioned based on random shuffling. Given the ten individual classifiers, each individual classifier is trained based on a kernel SVM (e.g., a Gaussian kernel with a variance of $\gamma=35$) for the images in its partition, and where each classifier is also trained on the subset of 30,000 images from all classes. Again, as with the prior examples, a more pronounced difference may occur between the performance of the individual classifiers, depending on the test image class, which may be expected because the random shuffling method does not enforce any significant diversity between the individual classifiers. As in the case of the kernel regressors (tables 500 and 520), some of the individual kernel SVM classifiers may be more accurate than the ensemble decision rule. In addition, all of the individual classifiers may be more accurate for a first set of the ten classes and less accurate for a second set of the ten classes, and may result in an intermediate performance for the other classes. In other words, the ensemble of classifiers may have poor diversity. Furthermore, in comparing with table 500 of FIG. 5A, the robustness of the kernel SVM ensemble (32.71%) under the FGM attack is lower than that of the ensemble of kernel regressors (61.08%).

A similar trend may occur for the PGD attack on kernel SVMs with e=0.3 (as in table 560 of FIG. 5D), with all other parameters remaining the same. Again, in comparing with Table 520 of FIG. 5B, it is noted that the robustness of the kernel SVM ensemble (53.29%, table 560, PGD, random shuffling, Gaussian SVM, γ=35) under the PGD attack is lower than that of the ensemble of kernel regressors (60.08%, table 520, random shuffling, Gaussian regression, γ=10).

—Exemplary Accuracy of Classifiers and Ensemble of Classifiers on Adversarial Images: Class Membership Method (Kernel Regression and Kernel SVM)

FIG. 6A depicts a table 600 indicating an exemplary confusion matrix for data perturbed based on an FGM attack (an example of a perturbation-bounded evasion attack), using a class membership method (an example of a class-based partition method) and a kernel regressor (an example of a Gaussian kernel classifier) with a variance value of 10, in accordance with an embodiment of the present application. FIG. 6B depicts a table 620 indicating an exemplary confusion matrix for data perturbed based on a PGD attack (an example of a perturbation-bounded evasion attack), using a class membership method (an example of a class-based partition method) and a kernel regressor (an example of a Gaussian kernel classifier) with a variance value of 10, in accordance with an embodiment of the present application.

In the scenarios shown in FIGS. 6A and 6B, assume that the same test data set of 10,000 images, which are not in the training data set and considered for the accuracy of FIGS. 4A-B, have been subjected to an FGM (table 600 of FIG. 6A) or PGD (table 620 of FIG. 6B) attack with a perturbation budget e=0.3, and that the training data set is partitioned based on class membership. Given the ten individual classifiers, each individual classifier is trained based on kernel regression (e.g., a Gaussian kernel with a variance of γ=10) for the images in its partition, and where each classifier is also trained on the subset of 30,000 images from all classes.

In table 600 of FIG. 6A, a more pronounced difference may occur between the accuracy performance of the individual classifiers, depending on the test image class. However, the ensemble, under the majority decision rule is more accurate than any of the individual classifiers. In comparison to the prior examples of the tables in FIGS. 5A-5D (using the random shuffling method), two differences can be noted: (1) For a given attack, the ensemble generated based on class membership has higher accuracy (62.740%, table 600 of FIG. 6A, FGM, class membership, Gaussian regression, γ=10) compared to the one based on random shuffling (61.080%, table 500 of FIG. 5A, FGM, random shuffling, Gaussian regression, γ=10); and (2) The class membership partition method enforces significant diversity between the individual classifiers. Specifically, some classifiers are better than others at classifying images belonging to a certain class. As an example, the first two classifiers have lower classification accuracy for images of class '0' and '1', but the other eight classifiers have much higher classification accuracy for those images. In other words, the ensemble constructed using the class membership method has better diversity than the ensemble constructed using the random shuffling method.

Similar trends may also occur for the PGD attack with e=0.3, as shown in table 620 of FIG. 6B. Again, the ensemble constructed using the class membership method (66.23%, table 620 of FIG. 6B, PGD, class membership, Gaussian regression, γ=10) has better classification accuracy and diversity than the ensemble constructed using the random shuffling method (60.08%, table 520 of FIG. 5B, PGD, random shuffling, Gaussian regression, γ=10).

FIG. 6C depicts a table indicating an exemplary confusion matrix for data perturbed based on an FGM attack (an example of a perturbation-bounded evasion attack), using a class membership method (an example of a class-based partition method) and a kernel SVM (an example of a Gaussian kernel classifier) with a variance of 35, in accordance with an embodiment of the present application. FIG. 6D depicts a table indicating an exemplary confusion matrix for data perturbed based on a PGD attack (an example of a perturbation-bounded evasion attack), using a class membership method (an example of a class-based partition method) and a kernel SVM (an example of a Gaussian kernel classifier) with a variance value of 35, in accordance with an embodiment of the present application.

In the scenarios shown in FIGS. 6C and 6D, assume that the same test data set of 10,000 images, which are not in the training data set and considered for the accuracy of FIGS. 4A-B, have been subjected to an FGM (table 640 of FIG. 6C) or PGD (table 660 of FIG. 6D) attack with a perturbation budget e=0.3, and that the training data set is partitioned based on class membership. Given the ten individual classifiers, each individual classifier is trained based on kernel SVMs (e.g., a Gaussian kernel with a variance of γ=35) for the images in its partition, and where each classifier is also trained on the subset of 30,000 images from all classes. Under attack for the random shuffling case, a more pronounced difference may occur between the performance of the individual classifiers, depending on the test image class. In comparison to the prior examples of the tables of FIGS. 5A-5D (using the random shuffling method), some differences can be noted: (1) For a given attack, the ensemble generated based on random shuffling has higher accuracy (32.710%, table 540 of FIG. 5C, FGM, random shuffling, Gaussian SVM, γ=35) compared to the one based on class membership (21.49%, table 640 of FIG. 6C, FGM, class membership, Gaussian SVM, γ=35); and (2) The class membership method enforces significant differences between the individual classifiers. Specifically, some classifiers are better than others at classifying images belonging to a certain class. As an example, the first classifier is more accurate for images of class '4' but the second classifier has lower accuracy performance for that class. In other words, the ensemble based on class membership has higher diversity but lower robustness than the ensemble constructed based on random shuffling.

Similar trends may also occur for the PGD attack with e=0.3, as shown in table 660 of FIG. 6D. Again, the ensemble constructed using the random shuffling method (53.29%, table 560 of FIG. 5D, PGD, random shuffling, Gaussian SVM, γ=35) has better performance than the ensemble constructed using the class membership method (39.64%, table 660 of FIG. 6D, PGD, class membership, Gaussian SVM, γ=35).

—Effect of Variance of the Gaussian Kernels (Kernel Regressors and Kernel SVMs)

As described above, the Gaussian kernel can serve as a basis function, tasked with representing the prediction rule, as either a classifier or regressor. Because this is a universal kernel, it can be used to represent any continuous prediction function with arbitrary precision. The prediction function can be viewed as a superposition of Gaussians with learned weights. This section describes the effect of the variance of the Gaussian function on the predictive ability of the kernel SVM and the kernel regressor ensembles, as described herein, and the effect for the two data partitioning methods: random shuffling (select training samples via random shuffling or sampling); and class membership (select training samples based on the associated class for a data object or image). These two partitioning methods can determine which samples are used to form the kernel basis.

Figure 7A:
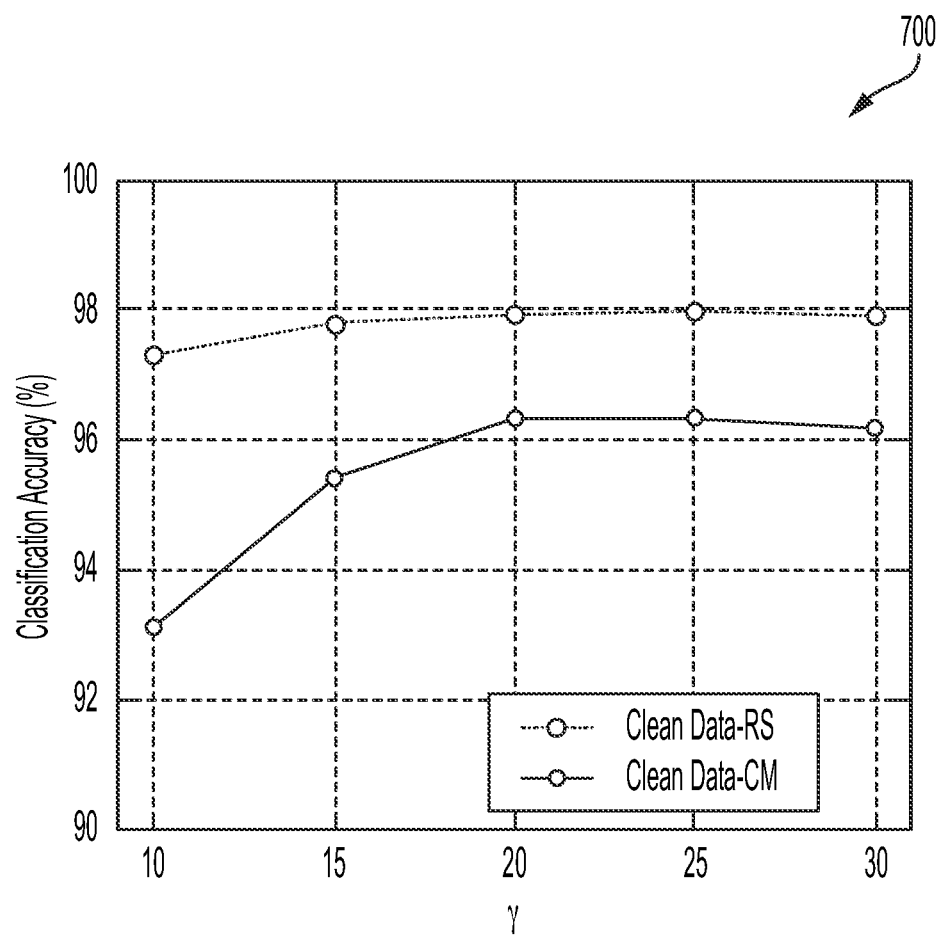
FIG. 7A depicts an exemplary diagram of the classification accuracy with respect to an optimizable parameter of an ensemble of Gaussian regressors under clean test images, including based on the random shuffling and class membership methods, in accordance with an embodiment of the present application.

FIG. 7A depicts an exemplary diagram 700 of the classification accuracy with respect to an optimizable parameter of an ensemble of Gaussian regressors under clean test images, including based on the random shuffling and class membership methods, in accordance with an embodiment of the present application. In FIG. 7A, the classification accuracy of the Gaussian kernel regressors is plotted against the kernel variance γ, for clean data, using both the random shuffling and class membership methods.

Figure 7B:
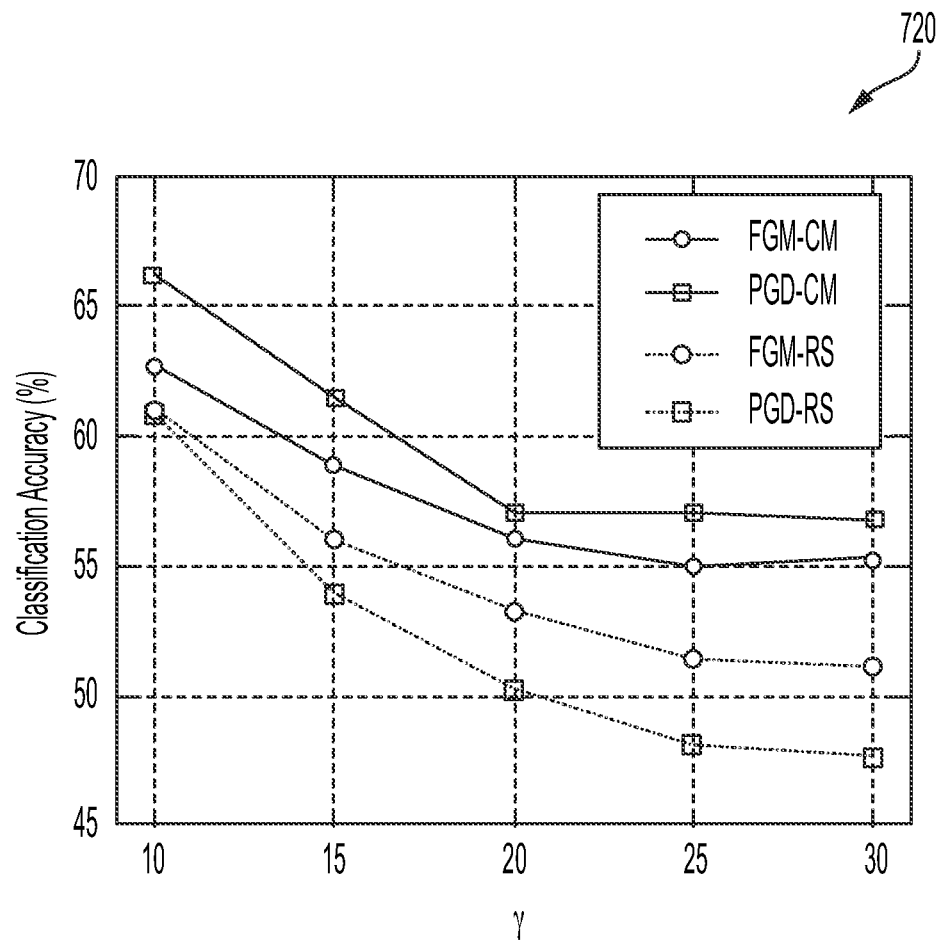
FIG. 7B depicts an exemplary diagram of the classification accuracy with respect to an optimizable parameter of an ensemble of Gaussian regressors under FGM and PGD attacks, including based on the random shuffling and class membership methods, in accordance with an embodiment of the present application.

FIG. 7B depicts an exemplary diagram 720 of the classification accuracy with respect to an optimizable parameter of an ensemble of Gaussian regressors under FGM and PGD attacks, including based on the random shuffling and class membership methods, in accordance with an embodiment of the present application. In FIG. 7B, the classification accuracy of the Gaussian kernel regressors is plotted against the kernel variance γ, for adversarial test images, for FGM and PGD attacks, and using both the random shuffling and class membership methods.

For clean test images, FIG. 7A demonstrates that the classification accuracy increases with γ, irrespective of the partitioning mechanism. However, for adversarial test images, FIG. 7B demonstrates that the classification accuracy increases as γ is reduced. This effect appears to be consistent irrespective of the type of attack (FGM or PGD) and the partitioning strategy. As demonstrated in the ensemble performance tables described above in relation to the scenarios of FIGS. 4A-B, 5A-B, and 6A-B, the accuracy is systematically higher with the class membership partitioning method than with the random shuffling partitioning method, for all values of γ tested. Finally, FIG. 7B demonstrates that for randomized shuffling, the ensemble is more robust to the FGM attack than to the PGD attack, and for class membership, the reverse is observed, i.e., the ensemble is more robust to the PGD attack than to the FGM attack, for all values of γ tested.

Figure 7C:
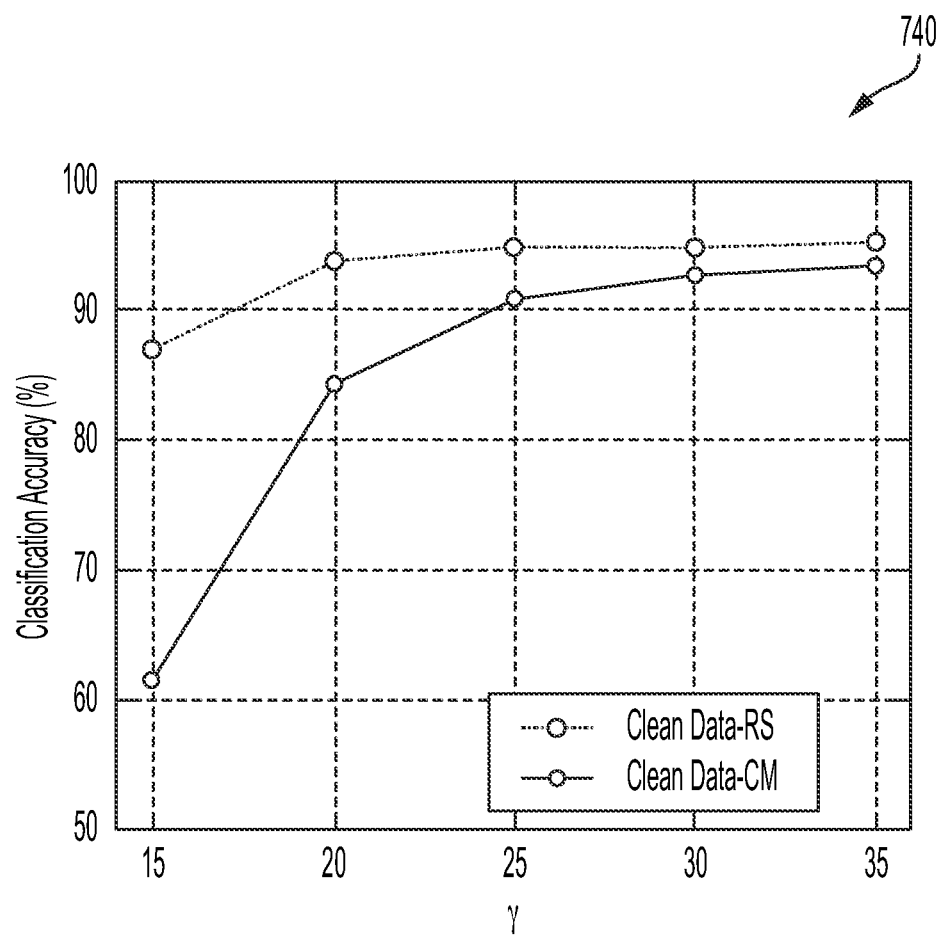
FIG. 7C depicts an exemplary diagram of the classification accuracy with respect to an optimizable parameter of an ensemble of Gaussian SVMs under clean test images, including based on the random shuffling and class membership methods, in accordance with an embodiment of the present application.

FIG. 7C depicts an exemplary diagram 740 of the classification accuracy with respect to an optimizable parameter of an ensemble of Gaussian SVMs under clean test images, including based on the random shuffling and class membership methods, in accordance with an embodiment of the present application. In FIG. 7C, the classification accuracy of the Gaussian kernel SVMs is plotted against the kernel variance y, for clean data, using both the random shuffling and class membership methods.

Figure 7D:
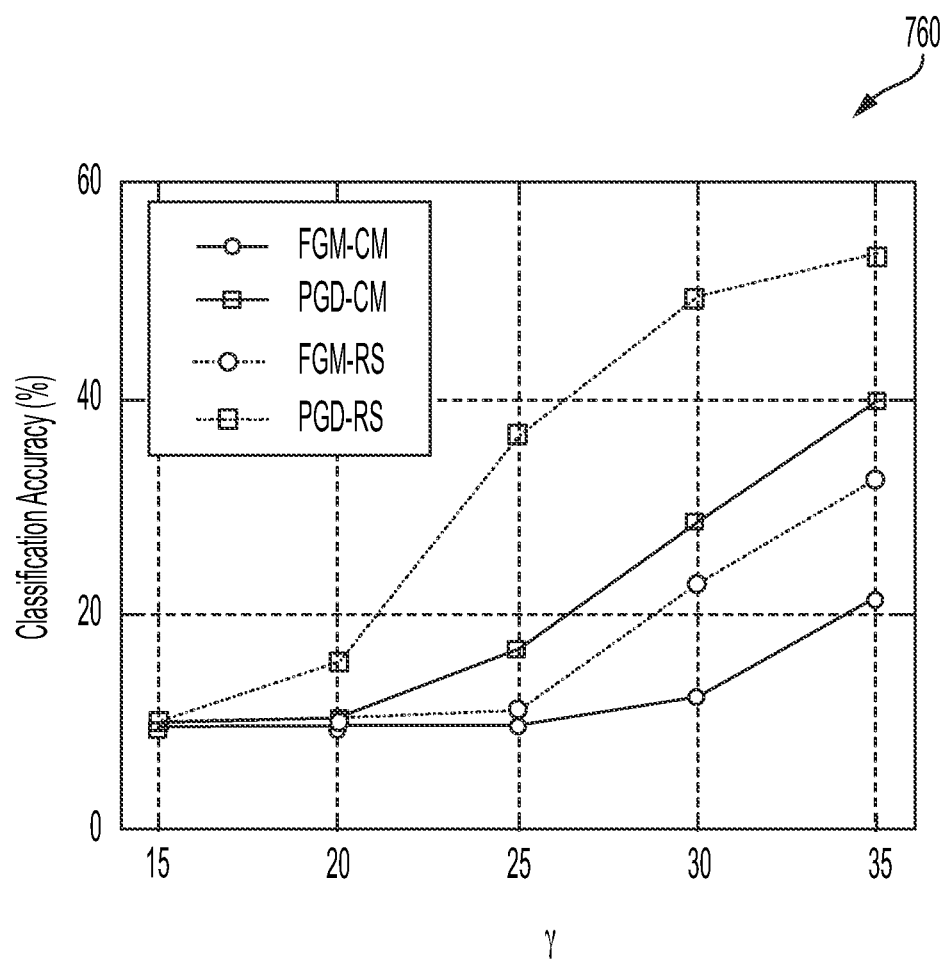
FIG. 7D depicts an exemplary diagram of the classification accuracy with respect to an optimizable parameter of an ensemble of Gaussian SVMs under FGM and PGD attacks, including based on the random shuffling and class membership methods, in accordance with an embodiment of the present application.

FIG. 7D depicts an exemplary diagram 760 of the classification accuracy with respect to an optimizable parameter of an ensemble of Gaussian SVMs under FGM and PGD attacks, including based on the random shuffling and class membership methods, in accordance with an embodiment of the present application. In FIG. 7D, the classification accuracy of the Gaussian kernel SVMs is plotted against the kernel variance y, for adversarial test images, for FGM and PGD attacks, and using both the random shuffling and class membership methods.

For clean test images, as is the case for kernel regressors described above in relation to FIG. 7A, FIG. 7C demonstrates that the classification accuracy increases with γ, irrespective of the partitioning method. However, for adversarial test images, FIG. 7D demonstrates that the classification accuracy decreases as γ is reduced. This is opposite to the trend noted for kernel regressors in FIG. 7B. This effect is consistent irrespective of the type of attack (FGM or PGD) and the partitioning method. Also, in contrast with the kernel regressor ensemble, FIG. 7D demonstrates that for both FGM and PGD attacks, the accuracy is higher with the random shuffling partitioning method than with the class membership partitioning method, for all values of γ tested. Furthermore, the ensemble of kernel SVMs is more robust to the PGD attack than to the FGM attack for both partitioning mechanisms, which is different from the case for kernel regressors.

Finally, in comparison with FIG. 7B, the best case accuracy under attack for kernel SVM ensembles (which occurs at or near γ=35) is lower than the best case accuracy for kernel regressor ensembles (which occurs at or near γ=10).

Thus, FIGS. 7A-D demonstrate the effect of the Gaussian variance on the classification accuracy, where the exemplary diagrams indicate optimization scenarios that can be used to manually fit the data. The Gaussian variance can determine the shape of the kernel, and there may be a plurality of parameters which can be tuned in order to obtain a kernel shape which yields the best performance in terms of robustness. These parameters may be referred to as "shape parameters of the kernel" which determine the size and eccentricity of the shape.

Integration into a Practical Application and Improvements to Technologies

The embodiments described herein can be integrated into a practical application for, and can result in an improvement in, several technologies and technical fields, including but not limited to: artificial intelligence; machine learning and analytics; convolutional neural networks; data mining (including of a significant volume of data); data classification; and defense against adversarial attacks and adversarial examples, including perturbation-bounded evasion attacks.

Users of the system described herein can include an individual with a smartphone, a mobile device, or a computing terminal (e.g., user 112 of environment 100 of FIG. 1). Users of the system can also include any client in a machine learning or an artificial intelligence setting, where increasing the effectiveness of classifiers against adversarial attacks can result in an increase in the accuracy of classification of test data. For example, the tables described above in relation to FIGS. 4A-B, 5A-D, and 6A-D support the technological improvements of the described embodiments because the tables indicate results which show that under attack, individual classifiers may perform poorly, but using an ensemble of classifiers and an ensemble decision rule (where the ensemble is constructed based on the methods described herein, e.g., dividing the training data into partitions to generate classifiers while training the classifiers over the entire training data set), the accuracy of the ensemble decision may be greater than the accuracy of any individual classifier.

Furthermore, the described embodiments provide an improvement to technology because the system allows a user to interact with the created ensembles and resulting classifications (as shown in the exemplary information displayed in display 114 of FIG. 1). The system can result in more efficiently training the machine learning models against adversarial examples, which can result both in an improved model and a more efficient overall user experience.

Exemplary Computer and Communication System

Figure 8:
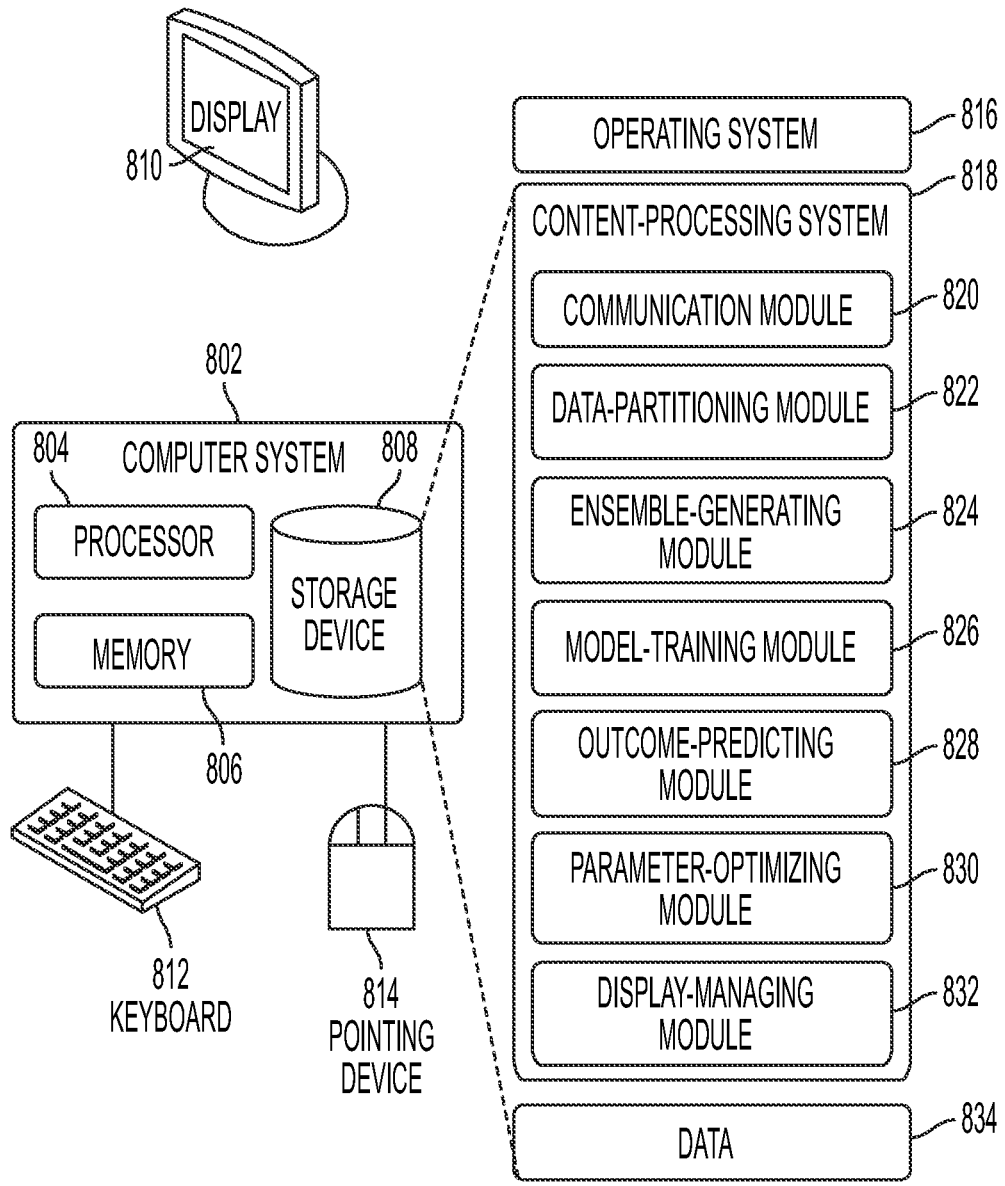
FIG. 8 presents an exemplary computer and communication system which facilitates construction of an ensemble of machine learning models to defend against adversarial examples, in accordance with an embodiment of the present application.

FIG. 8 presents an exemplary computer and communication system 802 which facilitates data classification, in accordance with an embodiment of the present application. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 834.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network (communication module 820). A data packet can include data, a request, a command, a model, a classifier, training data, and test data.

Content-processing system 818 can further include instructions for determining a training set of data objects, wherein each data object is associated with one of a plurality of classes (data-partitioning module 822). Content-processing system 818 can include instructions for dividing the training set of data objects into a number of partitions (data-partitioning module 822). Content-processing system 818 can include instructions for generating a respective machine learning model for each respective partition using a universal kernel function, which processes the data objects divided into a respective partition to obtain the ensemble of machine learning models (ensemble-generating module 824). Content-processing system 818 can include instructions for training the machine learning models based on the data objects of the training set (model-training module 826). Content-processing system 818 can include instructions for predicting an outcome for a testing data object based on the ensemble of machine learning models and an ensemble decision rule (outcome-predicting module 828).

Content-processing system 818 can additionally include instructions for optimizing shape parameters of the universal kernel for each respective classifier based on the predicted outcome, wherein the shape parameters indicate a size and eccentricity of a shape associated with each respective classifier (parameter-optimizing module 830). Content-processing system 818 can include instructions for displaying classifier and ensemble-related information on a display associated with a computing device of a user (display-managing module 832). Content-processing system 818 can include instructions for allowing a user to interact with the displayed information (display-managing module 832).

Data 834 can include any data that is required as input or that is generated as output by the methods and/or processes described in this disclosure. Specifically, data 834 can store at least: data; a set of data; a training set of data objects; a class or plurality of classes; a divided set of data; a partitioned set of data; a partition of data; a number of partitions; a machine learning model; a classifier; an ensemble of machine learning models or classifiers; a classification; a confusion matrix; an accuracy of a single classifier; an overall accuracy of a single classifier over multiple classes; an ensemble decision rule; an accuracy of an ensemble of classifiers; an outcome; a predicted outcome; testing data; a testing data object; an indicator of a random shuffling method or a class membership method; a universal kernel; a Gaussian kernel; a kernel regressor; a kernel SVM; a parameter; a shape parameter; a variance; a Gaussian variance; data which has been modified based on a perturbation-bounded evasion attack; an indicator of a size and eccentricity of a shape associated with a classifier; a number of a plurality of classes; a random number; a type of data; a type of attack; a type of partition method; a type of universal kernel; and a rule based on a majority vote or a maximum of an average of a probability of each respective class in a plurality of classes as reported by an individual classifier.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating construction of an ensemble of machine learning models, the method comprising:
   determining an entire training set of data objects, wherein each data object in the entire training set is associated with one of a plurality of classes;
   dividing the entire training set of data objects into a number of partitions;
   generating a respective machine learning model for each respective partition using a universal kernel function, which processes the data objects divided into a respective partition to obtain the ensemble of machine learning models;
   increasing effectiveness of the ensemble of machine learning models by training the respective machine learning model based on all the data objects of the entire training set;
   predicting an outcome for a testing data object based on the ensemble of machine learning models and an ensemble decision rule, wherein the testing data object is modified based on adversarial examples;
   displaying, on a device associated with a user, information related to ensemble results on the entire training set of data objects, wherein the information includes a type of data, a type of attack, a type of partition, a type of the universal kernel, a Gaussian variance, and a number corresponding to a class;

receiving, based on an interaction by the user with the displayed information, a request to change a configuration or setting related to one or more of the type of data, the type of attack, the type of partition, the type of the universal kernel, the Gaussian variance, and the number corresponding to a class;

changing the configuration or setting in response to receiving the request to change the configuration or setting;

updating the ensemble of machine learning models based on the changed configuration or setting; and increasing accuracy of predicting the outcome for the testing data object based on the updated ensemble of machine learning models and the ensemble decision rule.

2. The method of claim 1,
wherein dividing the training set of data objects into the number of partitions comprises dividing the training set of data objects into a number of partitions representing a number of classes of the training set of data objects, wherein a respective data object is associated with a respective partition defined by the class of the data object.

3. The method of claim 1,
wherein dividing the training set of data objects into the number of partitions comprises dividing the training set of data objects randomly into the number of partitions.

4. The method of claim 1,
wherein the universal kernel function comprises a Gaussian kernel function.

5. The method of claim 1, wherein the ensemble decision rule is based on one or more of:
a majority vote for a class by the individual models/classifiers;
a maximum of an average of a probability of each class as reported by the individual models/classifiers; and
a function which returns a value that can be ranked and is computed based on a likelihood score of each class as reported by the individual models/classifiers.

6. The method of claim 1,
wherein the respective machine learning model comprises a classifier,
wherein the ensemble of machine learning models comprises an ensemble of classifiers, and
wherein predicting the outcome for the testing data object is based on the ensemble of classifiers and comprises determining a class for the testing data object.

7. The method of claim 6, further comprising:
increasing, based on the obtained ensemble of classifiers, accuracy in classification of a set of test data which has been modified based on perturbation-bounded evasion attacks or other adversarial techniques.

8. The method of claim 6, further comprising:
optimizing shape parameters of the universal kernel for each respective classifier based on the predicted outcome,
wherein the shape parameters indicate a size and eccentricity of a shape associated with each respective classifier.

9. The method of claim 1, further comprising:
selecting the number of partitions into which the training set is divided based on one or more of:
a number of the plurality of classes;
a random number;
a similarity which can be measured on the data objects of the training set; and
a clustering algorithm.

10. The method of claim 1,
wherein the testing data object is modified based on an adversarial technique.

11. A computer system for facilitating data classification, the computer system comprising:
a processor; and
a storage device storing instructions that when executed by the processor cause the processor to perform a method, the method comprising:
determining an entire training set of data objects, wherein each data object in the entire training set is associated with one of a plurality of classes;
dividing the entire training set of data objects into a number of partitions;
generating a respective machine learning model for each respective partition using a universal kernel function, which processes the data objects divided into a respective partition to obtain the ensemble of machine learning models;
increasing effectiveness of the ensemble of machine learning models by training the respective machine learning model based on all the data objects of the entire training set;
predicting an outcome for a testing data object based on the ensemble of machine learning models and an ensemble decision rule, wherein the testing data object is modified based on adversarial examples;
displaying, on a device associated with a user, information related to ensemble results on the entire training set of data objects, wherein the information includes a type of data, a type of attack, a type of partition, a type of the universal kernel, a Gaussian variance, and a number corresponding to a class;
receiving, based on an interaction by the user with the displayed information, a request to change a configuration or setting related to one or more of the type of data, the type of attack, the type of partition, the type of the universal kernel, the Gaussian variance, and the number corresponding to a class;
changing the configuration or setting in response to receiving the request to change the configuration or setting;
updating the ensemble of machine learning models based on the changed configuration or setting; and
increasing accuracy of predicting the outcome for the testing data object based on the updated ensemble of machine learning models and the ensemble decision rule.

12. The computer system of claim 11,
wherein dividing the training set of data objects into the number of partitions comprises dividing the training set of data objects into a number of partitions representing a number of classes of the training set of data objects, wherein a respective data object is associated with a respective partition defined by the class of the data object.

13. The computer system of claim 11,
wherein dividing the training set of data objects into the number of partitions comprises dividing the training set of data objects randomly into the number of partitions.

14. The computer system of claim 11,
wherein the universal kernel function comprises a Gaussian kernel function.

15. The computer system of claim 11, wherein the ensemble decision rule is based on one or more of:
a majority vote for a class by the individual models/classifiers;

a maximum of an average of a probability of each class as reported by the individual models/classifiers; and a function which returns a value that can be ranked and is computed based on a likelihood score of each class as reported by the individual models/classifiers.

16. The computer system of claim 11,
wherein the respective machine learning model comprises a classifier,
wherein the ensemble of machine learning models comprises an ensemble of classifiers, and
wherein predicting the outcome for the testing data object is based on the ensemble of classifiers and comprises determining a class for the testing data object.

17. The computer system of claim 16, wherein the method further comprises:
increasing, based on the obtained ensemble of classifiers, accuracy in classification of a set of test data which has been modified based on perturbation-bounded evasion attacks or other adversarial techniques.

18. The computer system of claim 16, wherein the method further comprises:
optimizing shape parameters of the universal kernel for each respective classifier based on the predicted outcome,
wherein the shape parameters indicate a size and eccentricity of a shape associated with each respective classifier.

19. The computer system of claim 11, wherein the testing data object is modified based on an adversarial technique, and wherein the method further comprises:
selecting the number of partitions into which the training set is divided based on one or more of:
a number of the plurality of classes;
a random number;
a similarity which can be measured on the data objects of the training set; and
a clustering algorithm.

20. A non-transitory computer-readable storage medium storing instructions that when executed by a computer cause the computer to perform a method, the method comprising:
determining an entire training set of data objects, wherein each data object in the entire training set is associated with one of a plurality of classes;
dividing the entire training set of data objects into a number of partitions;
generating a respective machine learning model for each respective partition using a universal kernel function, which processes the data objects divided into a respective partition to obtain the ensemble of machine learning models;
increasing effectiveness of the ensemble of machine learning models by training the respective machine learning model based on all the data objects of the entire training set;
predicting an outcome for a testing data object based on the ensemble of machine learning models and an ensemble decision rule, wherein the testing data object is modified based on adversarial examples;
displaying, on a device associated with a user, information related to ensemble results on the entire training set of data objects, wherein the information includes a type of data, a type of attack, a type of partition, a type of the universal kernel, a Gaussian variance, and a number corresponding to a class;
receiving, based on an interaction by the user with the displayed information, a request to change a configuration or setting related to one or more of the type of data, the type of attack, the type of partition, the type of the universal kernel, the Gaussian variance, and the number corresponding to a class;
changing the configuration or setting in response to receiving the request to change the configuration or setting;
updating the ensemble of machine learning models based on the changed configuration or setting; and
increasing accuracy of predicting the outcome for the testing data object based on the updated ensemble of machine learning models and the ensemble decision rule.

* * * * *